United States Patent
Wu et al.

(10) Patent No.: US 11,206,666 B2
(45) Date of Patent: Dec. 21, 2021

(54) METHOD AND DEVICE IN UE AND BASE STATION FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 85 days.

(21) Appl. No.: 16/885,294

(22) Filed: May 28, 2020

(65) Prior Publication Data

US 2020/0296726 A1 Sep. 17, 2020

Related U.S. Application Data

(63) Continuation of application No. PCT/CN2017/115263, filed on Dec. 8, 2017.

(51) Int. Cl.
| | |
|---|---|
| *H04W 72/04* | (2009.01) |
| *H04W 16/14* | (2009.01) |
| *H04W 72/12* | (2009.01) |
| *H04B 7/0452* | (2017.01) |

(52) U.S. Cl.
CPC ...... *H04W 72/0453* (2013.01); *H04B 7/0452* (2013.01); *H04W 16/14* (2013.01); *H04W 72/12* (2013.01)

(58) Field of Classification Search
CPC .. H04W 72/12; H04W 16/14; H04W 72/0453

USPC .......................................................... 370/329
See application file for complete search history.

(56) References Cited

U.S. PATENT DOCUMENTS

2011/0085503 A1* 4/2011 Nam ................... H04L 5/0051
370/329
2013/0250882 A1 9/2013 Dinan

FOREIGN PATENT DOCUMENTS

| CN | 105992361 A | 10/2016 |
|---|---|---|
| CN | 106034360 A | 10/2016 |
| CN | 106612165 A | 5/2017 |

OTHER PUBLICATIONS

SR received in application No. PCT/CN2017/115263 dated Aug. 8, 2018.

* cited by examiner

*Primary Examiner* — Angel T Brockman

(57) ABSTRACT

The present disclosure provides a method and a device in a UE and a base station used for wireless communications. The UE receives a first signaling, a second signaling and a third signaling, and receives or transmits a first radio signal in a first frequency sub-band. The first signaling is used for determining M information sets, any of the information sets comprises a positive integer number of information element(s), any information element comprises a first-type index and a second-type index set, the second-type index set comprises one second-type index or more second-type indices. The second signaling is used for determining a first information set out of the M information sets. The third signaling is associated with the second signaling. The above method reduces the signaling overhead of beam management and indication in each bust on the Unlicensed Spectrum.

20 Claims, 19 Drawing Sheets

First information set

| First-type index | Second-type index set |
|---|---|
| 0 | Antenna port group#(0,0)<br>Antenna port group#(0,1) |
| 1 | Antenna port group#(1,0) |
| ⋮ | ⋮ |
| x | Antenna port group#(x,0)<br>Antenna port group#(x,1) |
| ⋮ | ⋮ |

First information element

FIG. 7

First information set

| First-type index | Second-type index set |
|---|---|
| 0 | Antenna port group#(0,0)<br>Antenna port group#(0,1) |
| 1 | Antenna port group#(1,0) |
| ⋮ | ⋮ |
| x | Antenna port group#(x,0) |
| ⋮ | ⋮ |

First information element

FIG. 8

METHOD AND DEVICE IN UE AND BASE STATION FOR WIRELESS COMMUNICATION

CROSS REFERENCE TO RELATED APPLICATIONS

This application is a continuation of International Application No. PCT/CN2017/115263, filed on Dec. 8, 2017, claiming the priority benefit of International Application PCT/CN2017/115263, filed on Dec. 8, 2017, the full disclosure of which is incorporated herein by reference.

BACKGROUND

Technical Field

The present disclosure relates to transmission methods and devices in wireless communication systems, and in particular to a communication scheme and device of data transmission on Unlicensed Spectrum.

Related Art

Application scenarios of future wireless communication systems are becoming increasingly diversified, and different application scenarios have different performance demands on systems. In order to meet different performance requirements of various application scenarios, a study item (SI) of access to New Radio (NR) Unlicensed Spectrum was approved at the $3^{rd}$ Generation Partner Project (3GPP) Radio Access Network (RAN) #75th plenary session. The SI was expected to be completed in R15 and a Work Item (WI) will be initiated in R16 to standardize relevant techniques.

Massive Multi-Input-Multi-Output (MIMO) is another hot topic of study on NR system. In massive MIMO, a plurality of antennas form through beamforming a narrow beam which points in a specific direction so as to improve communication quality. Massive MIMO in NR system is generally applied to Unlicensed Spectrum at the millimeter-wave frequency band.

SUMMARY

In the Long Term Evolution (LTE) License Assisted Access (LAA) project, a base station and a User Equipment (UE) shall first perform Listen Before Talk (LBT) before transmitting data on Unlicensed Spectrum so as to ensure that no interference will be caused to other ongoing wireless transmissions on the Unlicensed Spectrum.

Inventors find through researches that if a transmitting node (i.e., a base station or a UE) uses a beam for LBT, then it can only be assumed that the channel in the direction of the beam is idle, which does not lead to a further assumption that a channel in any other direction is idle. Based on this phenomenon, the transmitting node's transmission in a burst corresponding to this LBT will be limited within the coverage of the beam employed for the LBT. Such limitation can be used to reduce the signaling/feedback overhead for beam management and indication in each burst.

In view of the above discovery, the present disclosure provides a solution. It should be noted that the embodiments of the UE of the present disclosure and the characteristics in the embodiments can be applied to a base station, and vice versa, if no conflict is caused. And the embodiments of the present disclosure and the characteristics in the embodiments can be mutually combined if there is no conflict.

The present disclosure provides a method in a UE for wireless communications, comprising:

receiving a first signaling, the first signaling being used for determining M information sets, any information set of the M information sets comprising a positive integer number of information element(s), any information element of the positive integer number of information element(s) comprising a first-type index and a second-type index set, the second-type index set comprising one second-type index or more second-type indices, and the M being a positive integer greater than 1;

receiving a second signaling, the second signaling being used for determining a first information set out of the M information sets;

receiving a third signaling, the third signaling being associated with the second signaling, and the third signaling being used for determining a first information element out of the first information set;

receiving a first radio signal in a first frequency sub-band, (a) measurement(s) on (an) antenna port group(s) identified by (a) second-type index(indices) comprised in the first information element being used for a reception of the first radio signal; or, transmitting a first radio signal in a first frequency sub-band, (an) antenna port group(s) identified by (a) second-type index(indices) comprised in the first information element being used for a transmission of the first radio signal;

herein, the third signaling comprises scheduling information of the first radio signal, and an antenna port group comprises a positive integer number of antenna port(s).

In one embodiment, the above method is characterized in that beams used in each burst on the Unlicensed Spectrum are limited to one beam set, and any of the M information sets is used for indicating beam-related information within one beam set, so different information sets are for different beam sets. The second signaling indicates a beam set corresponding to the present burst, so that the UE is able to determine an information set corresponding to the present burst out of the M information sets. An advantage of the method is that since beams in each information set are limited to a beam set rather than all beams being grouped together, the number of bits required to indicate an information element out of an information set will be cut down, thereby reducing overhead of the third signaling.

In one subembodiment of the above embodiment, beams comprised in a beam set are restricted to the coverage of a beam used for a downlink LBT. The second signaling determines the first information set based on the downlink LBT beam corresponding to the present burst. The above method is beneficial to avoiding interferences with other ongoing wireless transmission in any direction other than a direction of the downlink LBT beam.

According to one aspect of the present disclosure, the above method is characterized in that a number of bits in the first signaling used for indicating any given first-type index in the M information sets is smaller than a number of bits in the first signaling used for indicating a second-type index in a second-type index set corresponding to the given first-type index.

In one embodiment, an advantage of the above method is to further reduce overhead of the third signaling.

In one embodiment, the given first-type index belongs to a given information element, the given information element is any information element of a given information set, the given information set is any information set of the M information sets; a number of bits in the first signaling used for indicating the given first-type index is equal to a logarithm of a number of information elements comprised in the given information set to the base 2 being rounded up to the nearest integer value with Math. ceil( ) which means: the number of bits in the first signaling used for indicating the given first-type index is equal to A1, the A1 is a minimum positive integer no less than $\log_2(B1)$, the B1 is the number of information elements comprised in the given information set.

In one embodiment, a given antenna port group is an antenna port group identified by a given second-type index, the given second-type index is a second-type index of a second-type index set corresponding to the given first-type index; the given antenna port group belongs to S candidate antenna port groups, the S is a positive integer greater than 1; a number of bits in the firs signaling used for indicating the given second-type index is equal to a logarithm of the S to the base 2 being rounded up to a nearest integer value with Math. ceil( ) which means: the number of bits in the first signaling used for indicating the given second-type index is equal to A2, the A2 is a minimum positive integer no less than $\log_2(S)$.

According to one aspect of the present disclosure, the second signaling indicates that a first multicarrier symbol group is occupied, the first multicarrier symbol group comprises a positive integer number of multicarrier symbol(s); time domain resources occupied by the third signaling are within the first multicarrier symbol group.

In one embodiment, an advantage of the above method is that association is created between the second signaling and the third signaling so as to prevent the UE from confusion about which information set of the M information sets the third signaling corresponds to.

According to one aspect of the present disclosure, all multicarrier symbols between time domain resources occupied by the second signaling and time domain resources occupied by the third signaling are occupied; or all multicarrier symbols between time domain resources occupied by the second signaling and time domain resources occupied by the first radio signal are occupied, the UE receives the first radio signal in the first frequency sub-band.

In one embodiment, an advantage of the above method is that association is created between the second signaling and the third signaling, or between the second signaling and the first radio signal, so as to prevent the UE from confusion about which information set of the M information sets the third signaling and the first radio signal correspond to.

In one embodiment, all multicarrier symbols between time domain resources occupied by the second signaling and time domain resources occupied by the third signaling are occupied, the UE transmits the first radio signal in the first frequency sub-band.

In one embodiment, all multicarrier symbols between time domain resources occupied by the second signaling and time domain resources occupied by the third signaling are occupied, the UE receives the first radio signal in the first frequency sub-band.

According to one aspect of the present disclosure, wherein the third signaling and the second signaling occupy a same time slice in time domain, the time slice comprises a positive integer number of contiguous multicarrier symbols; or, the third signaling and the second signaling belong to a same search space.

In one embodiment, an advantage of the above method is that association is created between the second signaling and the third signaling, so as to prevent the UE from confusion about which information set of the M information sets the third signaling corresponds to.

According to one aspect of the present disclosure, the third signaling comprises a first field, the first field of the third signaling is used for determining the first information element out of the first information set, a number of bits comprised by the first field of the third signaling is related to the first information set.

In one embodiment, an advantage of the above method is that a number of information elements comprised in the first information set can be used to determine a number of bits comprised by the first field of the third signaling, thus reducing overhead of the third signaling.

According to one aspect of the present disclosure, comprising:

performing a first access detection on the first frequency sub-band;

herein, the UE transmits the first radio signal in the first frequency sub-band; a type of the first access detection is a candidate type of N candidate types; the type of the first access detection and the second signaling are jointly used for determining the first information set out of the M information sets; the first access detection includes:

performing Q energy detections respectively in Q time sub-pools of the first frequency sub-band to obtain Q detection values respectively;

herein, each of Q1 detection value(s) out of the Q detection values is lower than a first threshold; a value of the Q1 is dependent on the type of the first access detection; the Q is a positive integer, the Q1 is a positive integer no greater than the Q.

In one embodiment, the above method is characterized in that if a transmission beam for the first radio signal is within the coverage of a corresponding downlink LBT beam, the UE will only need to perform a brief uplink LBT to transmit the first radio signal; but, if a transmission beam for the first radio signal is out of the coverage of a corresponding downlink LBT beam, the UE has to complete a whole uplink LBT process before transmitting the first radio signal. An advantage that lies therein is that the UE is allowed to use a beam which is beyond the LBT beam coverage in uplink transmission if a channel in the direction of the beam in use is detected as idle. The method improves flexibility of scheduling and avoids interference to ongoing wireless transmissions in other directions outside the coverage of the downlink LBT beam.

In one embodiment, an end time of the first access detection is prior to a start point of time domain resources occupied by the first radio signal.

In one embodiment, the first access detection is used for determining whether the first frequency sub-band is idle.

In one embodiment, the first access detection is uplink access detection.

In one embodiment, the first access detection is used for determining whether the first frequency sub-band can be used by the UE for uplink transmission.

In one embodiment, the Q1 is equal to the Q.

In one embodiment, the Q1 is less than the Q.

In one embodiment, the N is equal to 2.

In one embodiment, the N is greater than 2.

In one embodiment, the N candidate types include Type 1 UL channel access procedure and Type 2 UL channel access procedure.

In one embodiment, the N candidate types are composed of Type 1 UL channel access procedure and Type 2 UL channel access procedure.

In one embodiment, the Q detection values and the first threshold are measured by dBm.

In one embodiment, the Q detection values and the first threshold are measured by mW.

In one embodiment, the Q detection values and the first threshold are measured by J.

In one embodiment, the first threshold is equal to or less than −72 dBm.

In one embodiment, the first threshold is any value equal to or less than a first given value.

In one subembodiment, the first given value is predefined.

In one subembodiment, the first given value is configured by a higher layer signaling.

In one embodiment, the first threshold is selected by the UE liberally on the condition that the first threshold is equal to or less than a first given value.

In one subembodiment, the first given value is predefined.

In one subembodiment, the first given value is configured by a higher layer signaling.

In one embodiment, the second signaling is used for determining N information sets out of the M information sets, a type of the first access detection is used for determining the first information set out of the N information sets.

In one subembodiment, there is one information set out of the N information sets in which a number of information elements comprised is greater than a number of information elements comprised in any other information set out of the N information sets.

In one subembodiment, the N information sets respectively correspond to the N candidate types.

In one embodiment, the second signaling is used for determining N−1 information set(s) out of the M information sets, a type of the first access detection is used for determining the first information set out of the N−1 information set(s) and a reference information set, the reference information set is one information set of the M information sets that does not belong to the N−1 information set(s).

In one subembodiment of the above embodiment, a number of information elements comprised in the reference information set is greater than a number of information elements comprised in any information set of the N−1 information set(s).

In one subembodiment of the above embodiment, a number of information elements comprised in the reference information set is greater than a number of information elements comprised in any information set of the M information sets other than the reference information set.

In one subembodiment of the above embodiment, if a type of the first access detection is first-type uplink access detection, the first information set is the reference information set; the first-type uplink access detection is one of the N candidate types; the N−1 information set(s) respectively corresponds(correspond) to N−1 candidate type(s) of the N candidate types other than the first-type uplink access detection.

In one embodiment, the third signaling is used for determining a type of the first access detection.

In one embodiment, the third signaling comprises a third field, and the third field of the third signaling indicates a type of the first access detection.

In one embodiment, a type of the first access detection is related to duration of time domain resources occupied by the first radio signal.

According to one aspect of the present disclosure, a type of the first access detection is first-type uplink access detection, the Q1 is one of K1 candidate integers; the K1 is a positive integer.

In one embodiment, the first-type uplink access detection is a Type 1 UL channel access procedure; the detailed definition of the Type 1 UL channel access procedure can be found in 3GPP TS36.213, section 15.2.

In one embodiment, if the first radio signal only comprises a Sounding Reference Signal (SRS), the type of the first access detection is the first-type uplink access detection.

According to one aspect of the present disclosure, wherein the type of the first access detection is the second-type uplink access detection, the Q1 is equal to 2.

In one embodiment, the second-type uplink access detection is Type 2 UL channel access procedure; the detailed definition of the Type 2 UL channel access procedure can be found in 3GPP TS36.213, section 15.2.

In one embodiment, a fourth signaling is used for determining a second multicarrier symbol group, the second multicarrier symbol group comprises a positive integer number of multicarrier symbol(s), time domain resources occupied by the first radio signal belong to the second multicarrier symbol group, and the type of the first access detection is the second-type uplink access detection.

In one subembodiment, the fourth signaling is a physical layer signaling.

In one subembodiment, the fourth signaling is a dynamic signaling.

In one subembodiment, a signaling format of the fourth signaling is 1C.

In one subembodiment, the fourth signaling comprises a fourth field, the fourth field of the fourth signaling indicates the second multicarrier symbol group; the fourth field of the fourth signaling is a UL duration and offset field.

In one reference embodiment of the above subembodiment, the fourth field of the fourth signaling comprises 5 bits.

In one embodiment, if all multicarrier symbols between time domain resources occupied by the second signaling and time domain resources occupied by the first radio signal belong to the first multicarrier symbol group, and duration of time domain resources occupied by the first radio signal lasts no longer than 25 µs, the type of the first access detection is the second-type uplink access detection.

According to one aspect of the present disclosure, comprising:

receiving L downlink signalings, the L downlink signalings respectively indicating that L multicarrier symbol groups are occupied, each multicarrier symbol group of the L multicarrier symbol groups comprising a positive integer number of multicarrier symbol(s), the L being a positive integer greater than 1; and transmitting a first updating signaling, the first updating signaling being used for updating a target information set, the updated target information set being an information set of the M information sets;

herein, L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

In one embodiment, the first updating signaling is a physical layer signaling.

In one embodiment, the first updating signaling comprises Uplink Control Information (UCI).

In one embodiment, the first updating signaling comprises one or more of Channel State Information (CSI), Channel-state information reference signals Resource Indicator (CRI), Precoding Matrix Indicator (PMI), RSRP or CQI.

In one embodiment, the phrase that the first updating signaling is used for updating a target information set means that the first updating signaling is used for updating second-type index(indices) comprised in a second-type index set corresponding to one or more information elements comprised in the updated target information set.

In one embodiment, the phrase that the first updating signaling is used for updating a target information set means that the first updating signaling indicates second-type index (indices) comprised in a second-type index set corresponding to one or more updated information elements comprised in the updated target information set.

In one embodiment, the L1 is equal to 1.

In one embodiment, the L1 is greater than 1.

In one embodiment, the first updating signaling is transmitted on the first frequency sub-band.

In one embodiment, the first updating signaling is transmitted on a frequency band other than the first frequency sub-band.

In one embodiment, the first updating signaling is transmitted on a frequency band deployed on Licensed Spectrum.

The present disclosure provides a method in a base station for wireless communications, comprising:

transmitting a first signaling, the first signaling being used for determining M information sets, any information set of the M information sets comprising a positive integer number of information element(s), any information element of the positive integer number of information element(s) comprising a first-type index and a second-type index set, the second-type index set comprising one second-type index or more second-type indices, and the M being a positive integer greater than 1;

transmitting a second signaling, the second signaling being used for determining a first information set out of the M information sets;

transmitting a third signaling, the third signaling being associated with the second signaling, and the third signaling being used for determining a first information element out of the first information set; and transmitting a first radio signal in a first frequency sub-band, (a) measurement(s) on (an) antenna port group(s) identified by (a) second-type index(indices) comprised in the first information element being used for a reception of the first radio signal; or, transmitting a first radio signal in a first frequency sub-band, (an) antenna port group(s) identified by (a) second-type index(indices) comprised in the first information element being used for a transmission of the first radio signal;

herein, the third signaling comprises scheduling information of the first radio signal, and an antenna port group comprises a positive integer number of antenna port(s).

According to one aspect of the present disclosure, a number of bits in the first signaling used for indicating any given first-type index in the M information sets is smaller than a number of bits in the first signaling used for indicating a second-type index in a second-type index set corresponding to the given first-type index.

According to one aspect of the present disclosure, the second signaling indicates that a first multicarrier symbol group is occupied, the first multicarrier symbol group comprises a positive integer number of multicarrier symbol(s); time domain resources occupied by the third signaling are within the first multicarrier symbol group.

In one embodiment, the second signaling indicates that the first multicarrier symbol group is occupied by a downlink physical channel or a downlink physical signal transmitted by the base station.

According to one aspect of the present disclosure, all multicarrier symbols between time domain resources occupied by the second signaling and time domain resources occupied by the third signaling are occupied; or all multicarrier symbols between time domain resources occupied by the second signaling and time domain resources occupied by the first radio signal are occupied, the base station transmits the first radio signal in the first frequency sub-band.

According to one aspect of the present disclosure, the third signaling and the second signaling occupy a same time slice in time domain, the time slice comprises a positive integer number of contiguous multicarrier symbols; or, the third signaling and the second signaling belong to a same search space.

According to one aspect of the present disclosure, the third signaling comprises a first field, the first field of the third signaling is used for determining the first information element out of the first information set, a number of bits comprised by the first field of the third signaling is related to the first information set.

According to one aspect of the present disclosure, comprising:

determining a type of a first access detection;

herein, the base station receives the first radio signal in the first frequency sub-band, a transmitter of the first radio signal performs the first access detection on the first frequency sub-band before transmitting the first radio signal, a type of the first access detection is a candidate type of N candidate types, the type of the first access detection and the second signaling are jointly used for determining the first information set out of the M information sets.

In one embodiment, the first access detection is used for determining whether the first frequency sub-band is idle.

In one embodiment, the first access detection is uplink access detection.

According to one aspect of the present disclosure, comprising:

transmitting L downlink signalings, the L downlink signalings respectively indicating that L multicarrier symbol groups are occupied, each multicarrier symbol group of the L multicarrier symbol groups comprising a positive integer number of multicarrier symbol(s), the L being a positive integer greater than 1; and receiving a first updating signaling, the first updating signaling being used for updating a target information set, the updated target information set being an information set of the M information sets;

herein, L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

According to one aspect of the present disclosure, comprising:

performing a second access detection on the first frequency sub-band;

herein, the second access detection includes:

performing P energy detections respectively in P time sub-pools on the first frequency sub-band to obtain P detection values respectively;

herein, each of P1 detection value(s) out of the P detection values is lower than a second threshold, the P is a positive integer, the P1 is a positive integer no greater than the P.

In one embodiment, an end time of the second access detection is prior to a start point of time domain resources occupied by the second signaling.

In one embodiment, the second access detection is used for determining whether the first frequency sub-band can be used by the base station for downlink transmission.

In one embodiment, the second access detection is used for determining whether the first frequency sub-band is idle.

In one embodiment, the second access detection is a downlink access detection.

In one embodiment, the P1 is equal to the P.

In one embodiment, the P1 is less than the P.

In one embodiment, the P detection values and the second threshold are measured by dBm.

In one embodiment, the P detection values and the second threshold are measured by mW.

In one embodiment, the P detection values and the second threshold are measured by J.

In one embodiment, the second threshold is equal to or less than −72 dBm.

In one embodiment, the second threshold is any value equal to or less than a second given value.

In one subembodiment, the second given value is pre-defined.

In one embodiment, the second threshold is selected by the base station liberally on the condition that the second threshold is equal to or less than a second given value.

In one subembodiment, the second given value is pre-defined.

In one embodiment, a type of the second access detection is first-type downlink access detection, the P1 is a candidate integer of K2 candidate integers, and the K2 is a positive integer.

In one subembodiment of the above embodiment, the first-type downlink access detection is Cat 4 LBT; the detailed definition of the Cat 4 LBT can be found in 3GPP TR36.889.

In one embodiment, a type of the second access detection is second-type downlink access detection, and the P1 is equal to 2.

In one subembodiment of the above embodiment, the second-type downlink access detection is Cat 2 LBT; the detailed definition of the Cat 2 LBT can be found in 3GPP TR36.889.

The present disclosure provides a UE for wireless communications, comprising:

a first receiver, receiving a first signaling, a second signaling and a third signaling; the first signaling is used for determining M information sets, any information set of the M information sets comprises a positive integer number of information element(s), any information element of the positive integer number of information element(s) comprises a first-type index and a second-type index set, the second-type index set comprises one second-type index or more second-type indices; the second signaling is used for determining a first information set out of the M information sets; the third signaling is associated with the second signaling, the third signaling is used for determining a first information element out of the first information set;

a first processor, receiving a first radio signal in a first frequency sub-band, (a) measurement(s) on (an) antenna port group(s) identified by (a) second-type index(indices) comprised in the first information element being used for a reception of the first radio signal; or, transmitting a first radio signal in a first frequency sub-band, (an) antenna port group(s) identified by (a) second-type index(indices) comprised in the first information element being used for a transmission of the first radio signal;

herein, the third signaling comprises scheduling information of the first radio signal, the M is a positive integer greater than 1, and an antenna port group comprises a positive integer number of antenna port(s).

In one embodiment, the above UE for wireless communications is characterized in that a number of bits in the first signaling used for indicating any given first-type index in the M information sets is smaller than a number of bits in the first signaling used for indicating a second-type index in a second-type index set corresponding to the given first-type index.

In one embodiment, the above UE for wireless communications is characterized in that the second signaling indicates that a first multicarrier symbol group is occupied, the first multicarrier symbol group comprises a positive integer number of multicarrier symbol(s); time domain resources occupied by the third signaling are within the first multicarrier symbol group.

In one embodiment, the above UE for wireless communications is characterized in that all multicarrier symbols between time domain resources occupied by the second signaling and time domain resources occupied by the third signaling are occupied.

In one embodiment, the above UE for wireless communications is characterized in that all multicarrier symbols between time domain resources occupied by the second signaling and time domain resources occupied by the first radio signal are occupied; the UE receives the first radio signal in the first frequency sub-band.

In one embodiment, the above UE for wireless communications is characterized in that the third signaling and the second signaling occupy a same time slice in time domain, the time slice comprises a positive integer number of contiguous multicarrier symbols.

In one embodiment, the above UE for wireless communications is characterized in that the third signaling and the second signaling belong to a same search space.

In one embodiment, the above UE for wireless communications is characterized in that the third signaling comprises a first field, the first field of the third signaling is used for determining the first information element out of the first information set, a number of bits comprised by the first field of the third signaling is related to the first information set.

In one embodiment, the above UE for wireless communications is characterized in that the first receiver also receives L downlink signalings, the L downlink signalings respectively indicate that L multicarrier symbol groups are occupied, each multicarrier symbol group of the L multicarrier symbol groups comprises a positive integer number of multicarrier symbol(s), the L is a positive integer greater than 1. The first processor also transmits a first updating signaling, the first updating signaling is used for updating a target information set, and the updated target information set is an information set of the M information sets. Herein, L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

In one embodiment, the above UE for wireless communications is characterized in that the first processor also performs a first access detection on the first frequency sub-band; herein, the first processor transmits the first radio signal in the first frequency sub-band; a type of the first access detection is a candidate type of N candidate types; the type of the first access detection and the second signaling are jointly used for determining the first information set out of the M information sets; the first access detection includes:

performing Q energy detections respectively in Q time sub-pools of the first frequency sub-band to obtain Q detection values respectively;

herein, each of Q1 detection value(s) out of the Q detection values is lower than a first threshold; a value of the Q1 is dependent on the type of the first access detection; the Q is a positive integer, the Q1 is a positive integer no greater than the Q.

In one subembodiment of the above embodiment, the UE for wireless communications is characterized in that a type of the first access detection is first-type uplink access detection, the Q1 is one of K1 candidate integers; the K1 is a positive integer.

In one subembodiment of the above embodiment, the UE for wireless communications is characterized in that a type of the first access detection is second-type uplink access detection, the Q1 is equal to 2.

The present disclosure provides a base station for wireless communications, comprising:

a first transmitter, transmitting a first signaling, a second signaling and a third signaling; the first signaling is used for determining M information sets, any information set of the M information sets comprises a positive integer number of information element(s), any information element of the positive integer number of information element(s) comprises a first-type index and a second-type index set, the second-type index set comprises one second-type index or more second-type indices; the second signaling is used for determining a first information set out of the M information sets; the third signaling is associated with the second signaling, the third signaling is used for determining a first information element out of the first information set;

a second processor, transmitting a first radio signal in a first frequency sub-band, (a) measurement(s) on (an) antenna port group(s) identified by (a) second-type index (indices) comprised in the first information element being used for a reception of the first radio signal; or, receiving a first radio signal in a first frequency sub-band, (an) antenna port group(s) identified by (a) second-type index(indices) comprised in the first information element being used for a transmission of the first radio signal;

herein, the third signaling comprises scheduling information of the first radio signal, the M is a positive integer greater than 1, and an antenna port group comprises a positive integer number of antenna port(s).

In one embodiment, the above base station for wireless communications is characterized in that a number of bits in the first signaling used for indicating any given first-type index in the M information sets is smaller than a number of bits in the first signaling used for indicating a second-type index in a second-type index set corresponding to the given first-type index.

In one embodiment, the above base station for wireless communications is characterized in that the second signaling indicates that a first multicarrier symbol group is occupied, the first multicarrier symbol group comprises a positive integer number of multicarrier symbol(s), time domain resources occupied by the third signaling are within the first multicarrier symbol group.

In one embodiment, the above base station for wireless communications is characterized in that all multicarrier symbols between time domain resources occupied by the second signaling and time domain resources occupied by the third signaling are occupied.

In one embodiment, the above base station for wireless communications is characterized in that all multicarrier symbols between time domain resources occupied by the second signaling and time domain resources occupied by the first radio signal are occupied; the base station transmits the first radio signal in the first frequency sub-band.

In one embodiment, the above base station for wireless communications is characterized in that the third signaling and the second signaling occupy a same time slice in time domain, the time slice comprises a positive integer number of contiguous multicarrier symbols.

In one embodiment, the above base station for wireless communications is characterized in that the third signaling and the second signaling belong to a same search space.

In one embodiment, the above base station for wireless communications is characterized in that the third signaling comprises a first field, the first field of the third signaling is used for determining the first information element out of the first information set, a number of bits comprised by the first field of the third signaling is related to the first information set.

In one embodiment, the above base station for wireless communications is characterized in that the first transmitter also determines a type of a first access detection; herein, the base station receives the first radio signal in the first frequency sub-band; a transmitter of the first radio signal performs the first access detection in the first frequency sub-band before transmitting the first radio signal; the type of the first access detection is a candidate type of N candidate types; the type of the first access detection and the second signaling are jointly used for determining the first information set out of the M information sets.

In one embodiment, the above base station for wireless communications is characterized in that the first transmitter also transmits L downlink signalings, the L downlink signalings respectively indicate that L multicarrier symbol groups are occupied, each multicarrier symbol group of the L multicarrier symbol groups comprises a positive integer number of multicarrier symbol(s), the L is a positive integer greater than 1. The second processor also receives a first updating signaling, the first updating signaling is used for updating a target information set, the updated target information set is an information set of the M information sets. Herein, L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

In one embodiment, the above base station for wireless communications is characterized in that the second processor also performs a second access detection on the first frequency sub-band; herein, the second access detection includes:

performing P energy detections respectively in P time sub-pools on the first frequency sub-band to obtain P detection values respectively;

herein, each of P1 detection value(s) out of the P detection values is lower than a second threshold, the P is a positive integer, the P1 is a positive integer no greater than the P.

In one embodiment, the present disclosure is advantageous over conventional schemes in the following aspects:

Beams of all directions are divided into several beam sets, and each burst transmission on the Unlicensed Spectrum is limited to a beam set. By defining different beam indication tables for different beam sets, such as TCI tables, beams specified in each beam indication table are restricted within a corresponding beam set. So, compared with a beam indication table that covers all directions, each beam indication table gets smaller in size, thereby reducing signaling overhead needed in indicating an element from one table.

If a transmission node, for instance, a base station or a UE, discovers that a channel is idle in a certain beam direction when performing LBT on Unlicensed Spectrum, channels in other directions shall not be deemed as idle as the aforementioned channel, and a beam set employed by the transmission node in a burst corresponding to this LBT will have to be restricted in the coverage of the idle beam direction, thus avoiding interference with wireless transmissions in other directions on the Unlicensed Spectrum.

By conveying LBT beam-related information through a signaling identified by CC-RNTI and associating the signaling identified by the CC-RNTI with other physical layer signaling, the UE is enabled to determine precisely which beam indication table shall be applied.

The UE is allowed to utilize a beam out of the downlink LBT beam coverage in its uplink transmission if the UE detects an idle channel in the direction of the utilized beam. Uplink LBT performed on uplink beams out of the downlink LBT beam coverage is stricter than that performed on uplink beams within the downlink LBT beam coverage. The method helps improve the flexibility of scheduling and also avoid interference with other wireless transmissions in any direction outside the coverage of downlink LBT beam.

BRIEF DESCRIPTION OF THE DRAWINGS

Other features, objects and advantages of the present disclosure will become more apparent from the detailed description of non-restrictive embodiments taken in conjunction with the following drawings:

FIG. 7 illustrates a schematic diagram of a first information set according to one embodiment of the present disclosure.

FIG. 8 illustrates a schematic diagram of a first information set according to another embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
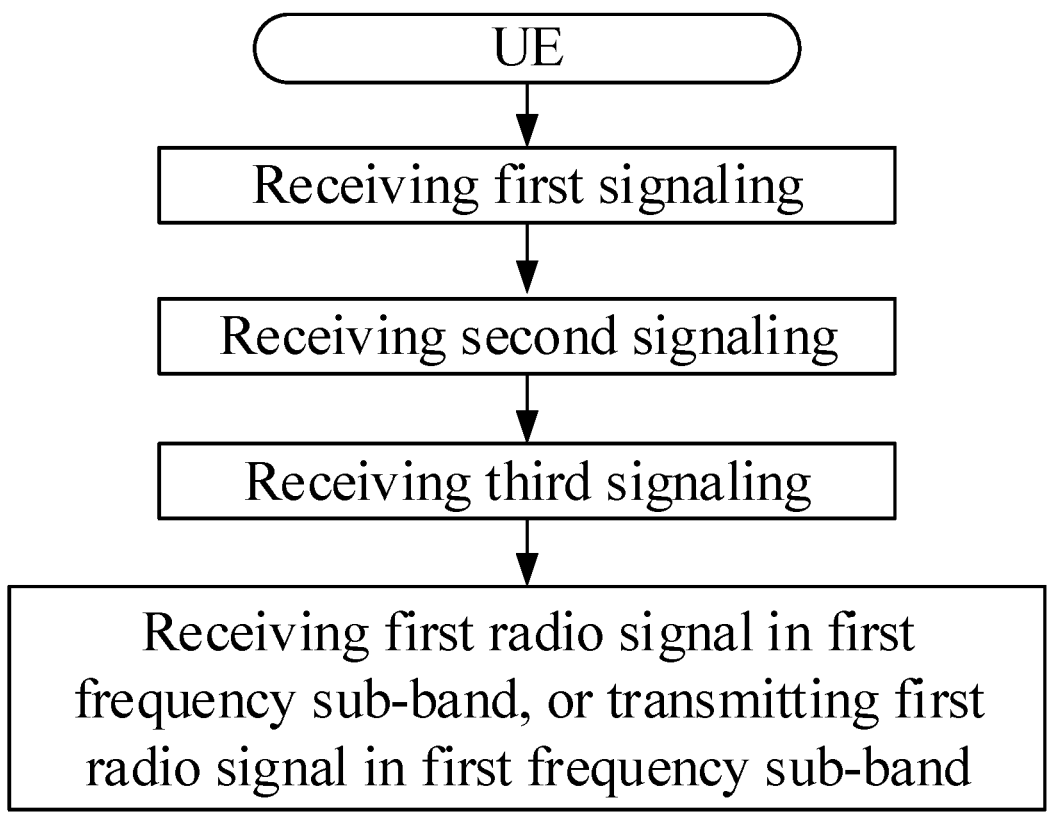
FIG. 1 illustrates a flowchart of a first signaling according to one embodiment of the present disclosure.

Embodiment 1 illustrates a flowchart of a first signaling, as shown in FIG. 1.

In Embodiment 1, the UE of the present disclosure receives a first signaling, a second signaling and a third signaling, and receives a first radio signal in a first frequency sub-band or transmits a first radio signal in a first frequency sub-band. Herein, the first signaling is used for determining M information sets, any information set of the M information sets comprises a positive integer number of information element(s), any information element of the positive integer number of information element(s) comprises a first-type index and a second-type index set, the second-type index set comprises one second-type index or more second-type indices, the M is a positive integer number greater than 1. The second signaling is used for determining a first information set out of the M information sets. The third signaling is associated with the second signaling, the third signaling is used for determining a first information element out of the first information set. If the UE receives the first radio signal in the first frequency sub-band, (a) measurement(s) on (an) antenna port group(s) identified by (a) second-type index (indices) comprised in the first information element is(are) used for a transmission of the first radio signal. The third signaling comprises scheduling information of the first radio signal; an antenna port group comprises a positive integer number of antenna port(s).

In one embodiment, the first signaling is a higher layer signaling.

In one embodiment, the first signaling is a Radio Resource Control (RRC) signaling.

In one embodiment, the first signaling is a Medium Access Control layer Control Element (MAC CE) signaling.

In one embodiment, the first signaling is a physical layer signaling.

In one embodiment, at least two information sets of the M information sets comprise unequal numbers of information elements.

In one embodiment, any two of the M information sets comprise equal numbers of information elements.

In one embodiment, the first signaling is transmitted on the first frequency sub-band.

In one embodiment, the first signaling is transmitted on a frequency band other than the first frequency sub-band.

In one embodiment, the first signaling is transmitted on a frequency band deployed on Licensed Spectrum.

In one embodiment, any first-type index out of the M information sets is a non-negative integer.

In one embodiment, any first-type index out of the M information sets is an index of a corresponding information element in an information set to which the corresponding information element belongs.

In one embodiment, any second-type index out of the M information sets is a non-negative integer.

In one embodiment, any second-type index out of the M information sets identifies an antenna port group.

In one embodiment, the second signaling is a physical layer signaling.

In one embodiment, the second signaling is a dynamic signaling.

In one embodiment, the second signaling is cell-common.

In one embodiment, the second signaling is specific to a terminal group, and the UE is a terminal of the terminal group.

In one embodiment, the second signaling comprises downlink control information (DCI).

In one embodiment, the second signaling is transmitted on the first frequency sub-band.

In one embodiment, a signaling identifier for the second signaling is a Component Carrier (CC)—Radio Network Temporary Identifier (RNTI).

In one embodiment, the second signaling is DCI identified by CC-RNTI.

In one embodiment, a CC-RNTI is used for generating an RS sequence of DeModulation Reference Signals (DMRS) corresponding to the second signaling.

In one embodiment, a Cyclic Redundancy Check (CRC) bit sequence of the second signaling is scrambled by a CC-RNTI.

In one embodiment, a signaling format of the second signaling is 1C.

In one embodiment, the second signaling is repeatedly transmitted in a positive integer number of time units, the positive integer number of time units are mutually orthogonal (non-overlapped) in time domain.

In one subembodiment, the UE receives the second signaling transmitted in each of the positive integer number of time units with varied beamforming vectors.

In one subembodiment, the UE receives the second signaling transmitted in each of the positive integer number of time units with varied analog beamforming matrixes.

In one subembodiment, the UE receives the second signaling transmitted in each of the positive integer number of time units with varied receiving spatial filterings.

In one subembodiment, any time unit of the positive integer number of time units comprises a positive integer number of multicarrier symbol(s).

In one subembodiment, the positive integer number of time units are continuous in time domain.

In one subembodiment, the positive integer number of time units are discontinuous in time domain.

In one subembodiment, the second signaling is transmitted in the positive integer number of time units by a same antenna port group.

In one embodiment, the first information set is one of the M information sets.

In one embodiment, the second signaling indicates an index of the first information set in the M information sets.

In one embodiment, the third signaling is a physical layer signaling.

In one embodiment, the third signaling is a dynamic signaling.

In one embodiment, the third signaling is UE-specific.

In one embodiment, the third signaling is a dynamic signaling used for Downlink Grant.

In one embodiment, the third signaling is a dynamic signaling used for Uplink Grant.

In one embodiment, the third signaling comprises DCI.

In one embodiment, the third signaling comprises Downlink Grant DCI.

In one embodiment, the third signaling comprises Uplink Grant DCI.

In one embodiment, the third signaling is transmitted on the first frequency sub-band.

In one embodiment, the third signaling is transmitted on a frequency band other than the first frequency sub-band.

In one embodiment, the third signaling is transmitted on a frequency band deployed on Licensed Spectrum.

In one embodiment, a signaling identifier for the third signaling is a Cell-RNTI(C-RNTI).

In one embodiment, the third signaling is DCI identified by C-RNTI.

In one embodiment, a C-RNTI is used for generating an RS sequence of DMRS corresponding to the third signaling.

In one embodiment, a CRC bit sequence of the third signaling is scrambled by a C-RNTI.

In one embodiment, the first information element is an information element of the first information set.

In one embodiment, the third signaling indicates an index of the first information element in the first information set.

In one embodiment, the first frequency sub-band is deployed on Unlicensed Spectrum.

In one embodiment, the first frequency sub-band is a Carrier.

In one embodiment, the first frequency sub-band is a Bandwidth part (BWP).

In one embodiment, the first frequency sub-band comprises a positive integer number of Physical Resource Block(s) (PRB) in frequency domain.

In one embodiment, the first frequency sub-band comprises a positive integer number of contiguous PRBs in frequency domain.

In one embodiment, the first frequency sub-band comprises a positive integer number of contiguous subcarriers in frequency domain.

In one embodiment, the first radio signal comprises at least one of uplink data or an uplink reference signal, the UE transmits the first radio signal in the first frequency sub-band.

In one subembodiment of the above embodiment, the uplink reference signal comprises one or more than one of SRS, DMRS and PTRS.

In one embodiment, the first radio signal comprises at least one of downlink data or a downlink reference signal, the UE receives the first radio signal in the first frequency sub-band.

In one subembodiment of the above embodiment, the downlink reference signal comprises one or more than one of CSI-RS, DMRS, PTRS or TRS.

In one embodiment, the phrase that a measurement on a given antenna port group is used for a reception of a given radio signal means that the UE can deduce all or part of large-scale properties of the given radio signal from all or part of large-scale properties of a radio signal transmitted by the given antenna port group.

In one embodiment, the large-scale properties of the given radio signal include one or more of delay spread, Doppler spread, Doppler shift, path loss, average gain, average delay, angle of arrival, and angle of departure, spatial correlation, multi-antenna-related transmission or multi-antenna-related reception.

In one embodiment, the multi-antenna-related reception refers to Spatial Rx parameters.

In one embodiment, the multi-antenna-related reception refers to reception beam.

In one embodiment, the multi-antenna-related reception refers to reception analog beamforming matrix.

In one embodiment, the multi-antenna-related reception refers to reception beamforming vector.

In one embodiment, the multi-antenna-related reception refers to reception spatial filtering.

In one embodiment, the multi-antenna-related transmission refers to Spatial Tx parameters.

In one embodiment, the multi-antenna-related transmission refers to transmission beam.

In one embodiment, the multi-antenna-related transmission refers to transmission analog beamforming matrix.

In one embodiment, the multi-antenna-related transmission refers to transmission beamforming vector.

In one embodiment, the multi-antenna-related transmission refers to transmission spatial filtering.

In one embodiment, the phrase that a given antenna port group is used for a transmission of a given radio signal means that large-scale properties of a radio signal transmitted by the given antenna port group can be used to deduce multi-antenna-related transmission of the given radio signal.

In one embodiment, the phrase that a given antenna port group is used for a transmission of a given radio signal means that multi-antenna-related transmission of the given antenna port group can be used to deduce multi-antenna-related transmission of the given radio signal.

In one embodiment, the phrase that a given antenna port group is used for a transmission of a given radio signal means that any antenna port of a transmission antenna port group of the given radio signal is QCL with any antenna port of the given antenna port group.

In one embodiment, the phrase that a given antenna port group is used for a transmission of a given radio signal means that any antenna port of a transmission antenna port group of the given radio signal is QCL with at least one antenna port of the given antenna port group.

In one embodiment, the phrase that a given antenna port group is used for a transmission of a given radio signal means that at least one antenna port of a transmission antenna port group of the given radio signal is QCL with at least one antenna port of the given antenna port group.

In one embodiment, the phrase that a given antenna port group is used for a transmission of a given radio signal means that any antenna port of a transmission antenna port group of the given radio signal and any antenna port of the given antenna port group are spatially QCL.

In one embodiment, the phrase that a given antenna port group is used for a transmission of a given radio signal means that any antenna port of a transmission antenna port group of the given radio signal and at least one antenna port of the given antenna port group are spatially QCL.

In one embodiment, the phrase that a given antenna port group is used for a transmission of a given radio signal means that at least one antenna port of a transmission antenna port group of the given radio signal and at least one antenna port of the given antenna port group are spatially QCL.

In one embodiment, two antenna ports being QCL means that all or part of large-scale properties of a radio signal transmitted by one of the two antenna ports can be used to deduce all or part of large-scale properties of a radio signal transmitted by the other antenna port of the two antenna ports.

In one embodiment, two antenna ports being QCL means that at least one same QCL parameter is shared by the two antenna ports, the QCL parameter includes both multi-antenna-related parameter and multi-antenna-unrelated QCL parameter.

In one embodiment, the multi-antenna-related QCL parameter comprises one or more of angle of arrival, angle of departure, and spatial correlation, multi-antenna-related transmission and multi-antenna-related reception.

In one embodiment, the multi-antenna-unrelated QCL parameter comprises one or more of delay spread, Doppler spread, Doppler shift, path loss or average gain.

In one embodiment, two antenna ports being QCL means that at least one QCL parameter of one antenna port of the two antenna ports can be used to deduce at least one QCL parameter of the other antenna port of the two antenna ports.

In one embodiment, any two antenna ports of an antenna port group are QCL.

In one embodiment, two antenna ports being spatially QCL means that all or part of multi-antenna-related large-scale properties of a radio signal transmitted by one of the two antenna ports can be used to deduce all or part of multi-antenna-related large-scale properties of a radio signal transmitted by the other antenna port of the two antenna ports.

In one embodiment, two antenna ports being spatially QCL means that at least one same multi-antenna-related spatial QCL parameter is shared by the two antenna ports.

In one embodiment, two antenna ports being spatially QCL means that at least one multi-antenna-related QCL parameter of one antenna port of the two antenna ports can be used to deduce at least one multi-antenna-related QCL parameter of the other antenna port of the two antenna ports.

In one embodiment, any two antenna ports of an antenna port group are spatially QCL.

In one embodiment, the scheduling information of the first radio signal comprises at least one of a Modulation and Coding Scheme (MCS), configuration information of DMRS, a Hybrid Automatic Repeat reQuest (HARD) process number, a Redundancy Version (RV) or a New Data Indicator (NDI).

In one subembodiment, the configuration information of the DMRS comprises one or more of occupied time domain resources, occupied frequency domain resources, occupied code domain resources, cyclic shift, or an Orthogonal Cover Code (OCC).

Embodiment 2

Figure 2:
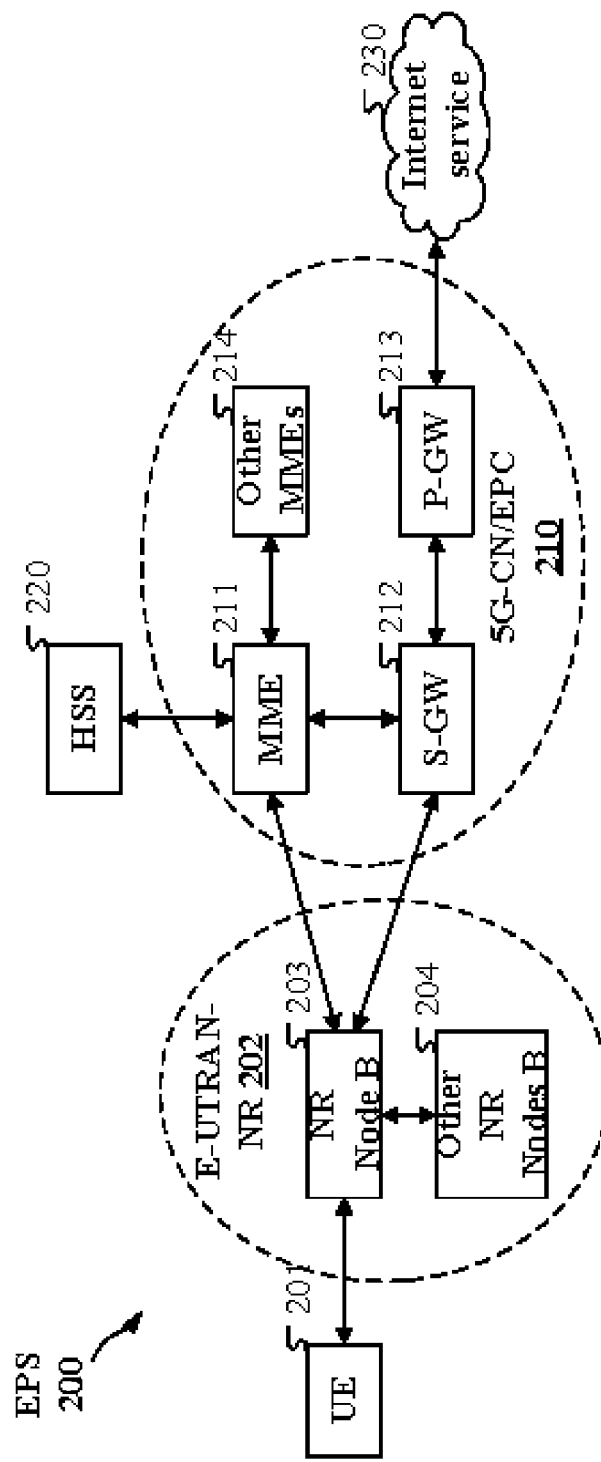
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN-NR 202, a 5G-CoreNetwor/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The E-UTRAN-NR 202 comprises an NR node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5G-CN/EPC 210 via an S1 interface. The 5G-CN/EPC 210 comprises a Mobility Management Entity (MME) 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, and the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services (PSS).

In one embodiment, the UE 201 corresponds to the UE in the present disclosure.

In one embodiment, the gNB 203 corresponds to the base station in the present disclosure.

In one embodiment, the UE 201 supports wireless communications in which data transmission is performed on Unlicensed Spectrum.

In one embodiment, the gNB 203 supports wireless communications in which data transmission is performed on Unlicensed Spectrum.

In one embodiment, the UE 201 supports wireless communications of massive MIMO.

In one embodiment, the gNB 203 supports wireless communications of massive MIMO.

Embodiment 3

Figure 3:
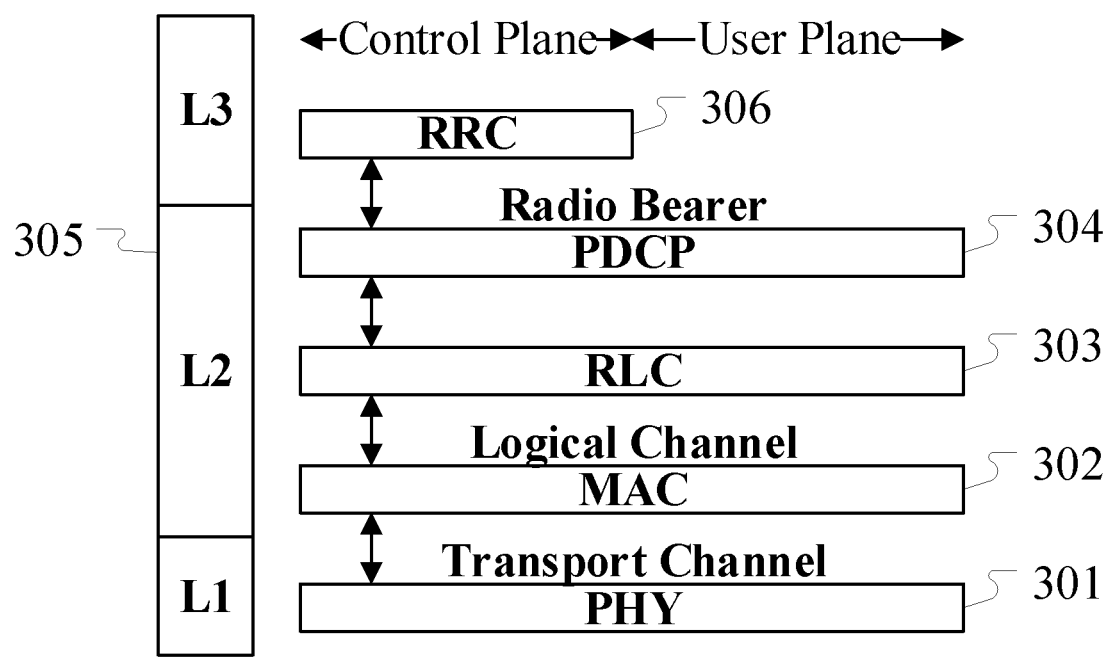
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the PHY 301.

In one embodiment, the second signaling in the present disclosure is generated by the PHY 301.

In one embodiment, the third signaling in the present disclosure is generated by the PHY 301.

In one embodiment, the first radio signal in the present disclosure is generated by the PHY 301.

In one embodiment, the L downlink signalings in the present disclosure are respectively generated by the PHY 301.

In one embodiment, the first updating signaling in the present disclosure is generated by the PHY 301.

Embodiment 4

Figure 4:
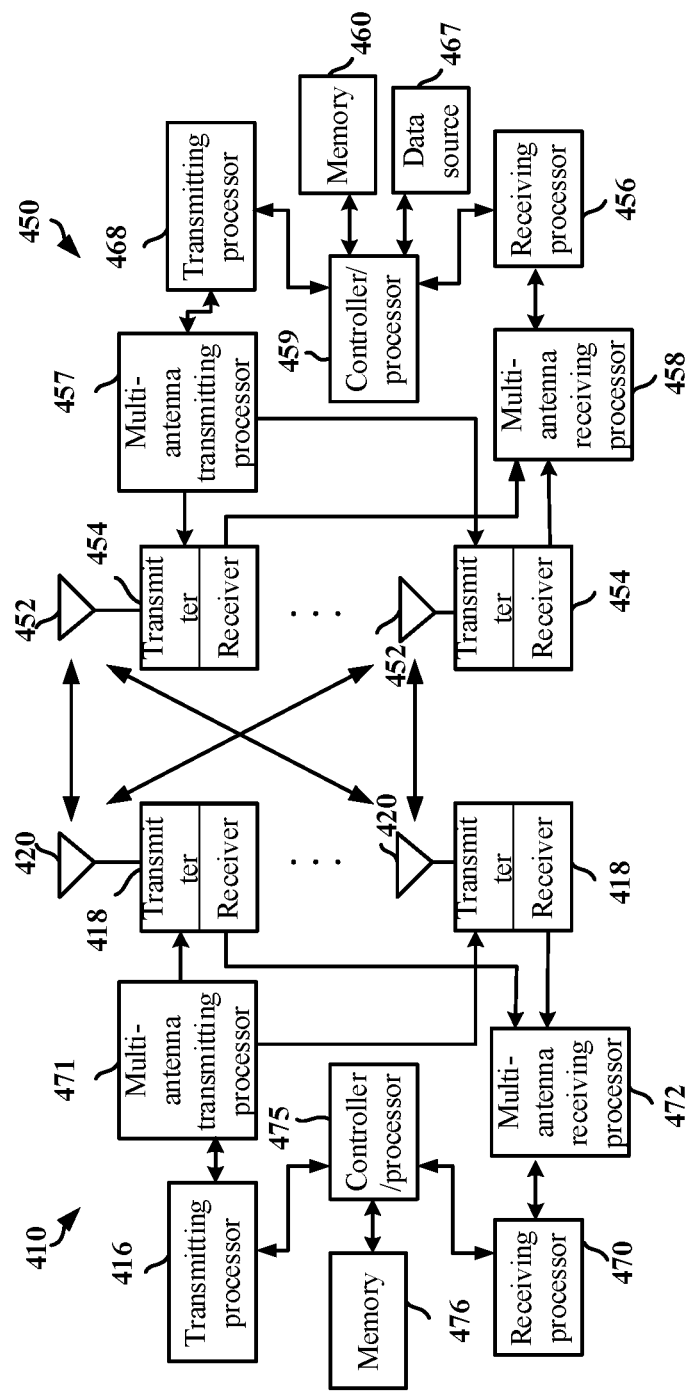
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram of a UE 450 and a gNB 410 in communication with each other in an access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for the L1 layer (that is, PHY). The transmitting processor 416 performs coding and interleaving so as to ensure a Forward Error Correction (FEC) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream from time domain into frequency domain using FFT. In frequency domain, a physical layer data signal and a reference signal are de-multiplexed by the receiving processor 456, of which the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding and beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first signaling of the present disclosure, receives the second signaling of the present disclosure, receives the third signaling of the present disclosure, receives the first radio signal of the present disclosure in the first frequency sub-band of the present disclosure and transmits the first radio signal of the present disclosure in the first frequency sub-band of the present disclosure.

In one embodiment, the UE 450 comprises a memory that stores a computer readable instruction program. The computer readable instruction program generates an action when executed by at least one processor. The action includes: receiving the first signaling of the present disclosure, receiving the second signaling of the present disclosure, receiving the third signaling of the present disclosure, receiving the first radio signal of the present disclosure in the first frequency sub-band of the present disclosure and transmitting the first radio signal of the present disclosure in the first frequency sub-band of the present disclosure.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first signaling of the present disclosure, transmits the second signaling of the present disclosure, transmits the third signaling of the present disclosure, transmits the first radio signal of the present disclosure in the first frequency sub-band of the present disclosure and receives the first radio signal of the present disclosure in the first frequency sub-band of the present disclosure.

In one embodiment, the gNB 410 comprises a memory that stores a computer readable instruction program. The computer readable instruction program generates an action when executed by at least one processor. The action includes: transmitting the first signaling of the present disclosure, transmitting the second signaling of the present disclosure, transmitting the third signaling of the present disclosure, transmitting the first radio signal of the present disclosure in the first frequency sub-band of the present disclosure and receiving the first radio signal of the present disclosure in the first frequency sub-band of the present disclosure.

In one embodiment, the UE 450 corresponds to the UE in the present disclosure.

In one embodiment, the gNB 410 corresponds to the base station in the present disclosure.

In one embodiment, at least one of the antenna 452, the receiver 454, the receiving processor 456, the multi-antenna receiving processor 458 or the controller/processor 459 is used for receiving the first signaling; at least one of the antenna 420, the transmitter 418, the transmitting processor 416, the multi-antenna transmitting processor 471 or the controller/processor 475 is used for transmitting the first signaling.

In one embodiment, at least one of the antenna 452, the receiver 454, the receiving processor 456, the multi-antenna receiving processor 458 or the controller/processor 459 is used for receiving the second signaling; at least one of the antenna 420, the transmitter 418, the transmitting processor 416, the multi-antenna transmitting processor 471 or the controller/processor 475 is used for transmitting the second signaling.

In one embodiment, at least one of the antenna 452, the receiver 454, the receiving processor 456, the multi-antenna receiving processor 458 or the controller/processor 459 is used for receiving the third signaling; at least one of the antenna 420, the transmitter 418, the transmitting processor 416, the multi-antenna transmitting processor 471 or the controller/processor 475 is used for transmitting the third signaling.

In one embodiment, at least one of the antenna 452, the receiver 454, the receiving processor 456, the multi-antenna receiving processor 458 or the controller/processor 459 is used for receiving the first radio signal; at least one of the antenna 420, the transmitter 418, the transmitting processor 416, the multi-antenna transmitting processor 471 or the controller/processor 475 is used for transmitting the first radio signal.

In one embodiment, at least one of the antenna 420, the receiver 418, the receiving processor 470, the multi-antenna receiving processor 472 or the controller/processor 475 is used for receiving the first radio signal; at least one of the antenna 452, the transmitter 454, the transmitting processor 468, the multi-antenna transmitting processor 457 or the controller/processor 459 is used for transmitting the first radio signal.

In one embodiment, at least one of the antenna 452, the receiver 454, the receiving processor 456, the multi-antenna receiving processor 458 or the controller/processor 459 is used for performing the first access detection.

In one embodiment, at least one of the antenna 420, the receiver 418, the receiving processor 470, the multi-antenna receiving processor 472 or the controller/processor 475 is used for performing the second access detection.

In one embodiment, at least one of the antenna 452, the receiver 454, the receiving processor 456, the multi-antenna receiving processor 458 or the controller/processor 459 is used for receiving the L downlink signalings; at least one of the antenna 420, the transmitter 418, the transmitting processor 416, the multi-antenna transmitting processor 471 or the controller/processor 475 is used for transmitting the L downlink signalings.

In one embodiment, at least one of the antenna 420, the receiver 418, the receiving processor 470, the multi-antenna receiving processor 472 or the controller/processor 475 is used for receiving the first updating signaling; at least one of the antenna 452, the transmitter 454, the transmitting processor 468, the multi-antenna transmitting processor 457 or the controller/processor 459 is used for transmitting the first updating signaling.

Embodiment 5

Figure 5:
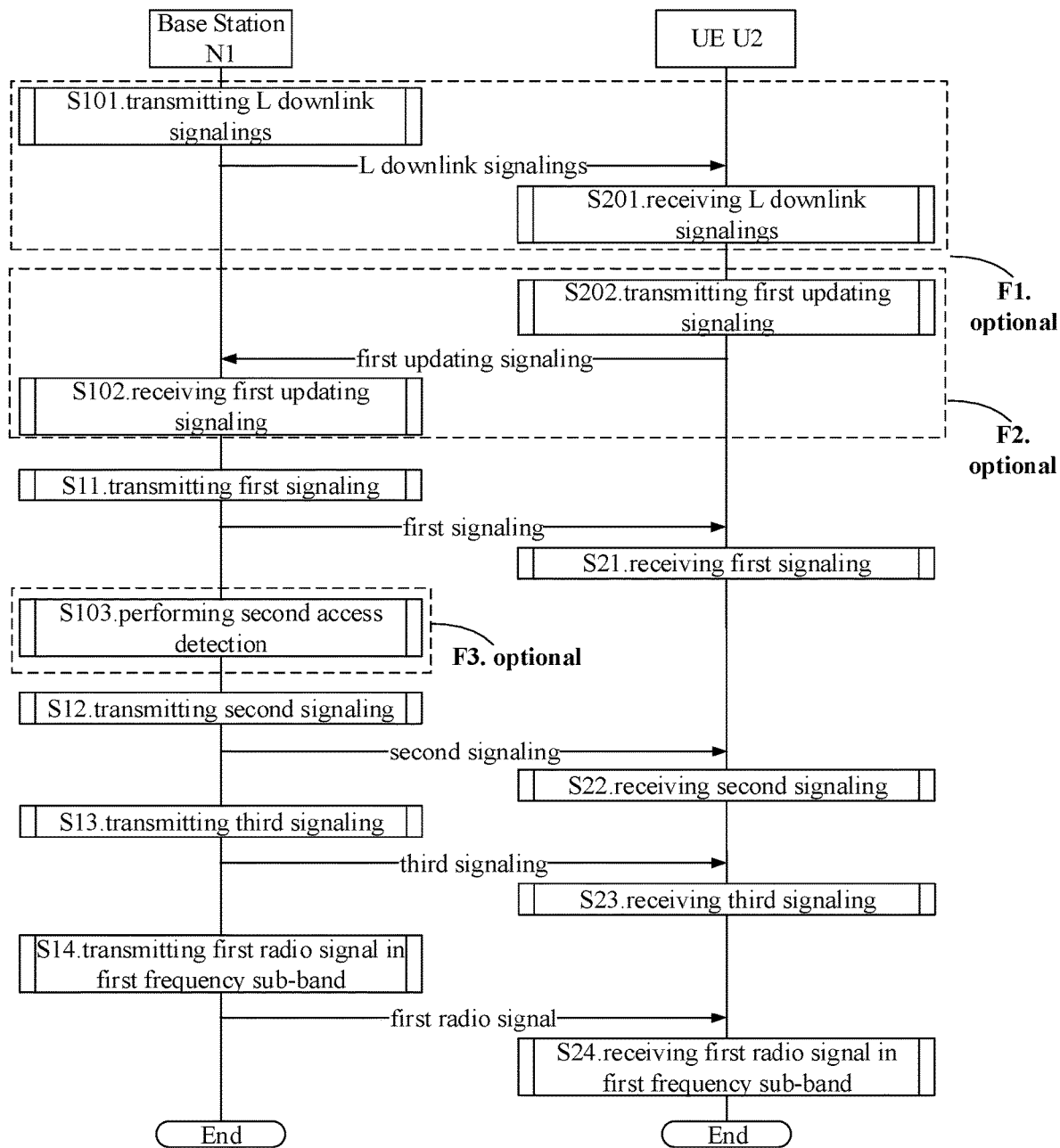
FIG. 5 illustrates a flowchart of wireless transmission according to one embodiment of the present disclosure.

Embodiment 5 illustrates a flowchart of wireless transmission, as shown in FIG. 5. In FIG. 5, a base station N1 is a maintenance base station for a serving cell of a UE U2. Steps in boxes F1, F2 and F3 are optional, respectively.

The N1 transmits L downlink signalings in step S101; receives a first updating signaling in step S102; transmits a first signaling in step S11; performs a second access detection in step S103; transmits a second signaling in step S12; transmits a third signaling in step S13; and transmits a first radio signal in a first frequency sub-band in step S14.

The U2 receives L downlink signalings in step S201; transmits a first updating signaling in step S202; receives a first signaling in step 21; receives a second signaling in step S22; receives a third signaling in step S23; and receives a first radio signal in a first frequency sub-band in step S24.

In Embodiment 5, the first signaling is used by the U2 for determining M information sets, any information set of the M information sets comprises a positive integer number of information element(s), any information element of the positive integer number of information element(s) comprises a first-type index and a second-type index set, the second-type index set comprises one second-type index or more second-type indices, the M is a positive integer number greater than 1. The second signaling is used by the U2 for determining a first information set out of the M information sets. The third signaling is associated with the second signaling, the third signaling is used by the U2 for determining a first information element out of the first information set. Measurement(s) on an antenna port group(s) identified by (a) second-type index(indices) comprised in the first information element is(are) used by the U2 for a reception of the first radio signal. The third signaling comprises scheduling information of the first radio signal; an antenna port group comprises a positive integer number of antenna port(s). The L downlink signalings respectively indicate that L multicarrier symbol groups are occupied, each multicarrier symbol group of the L multicarrier symbol groups comprises a positive integer number of multicarrier symbol(s), the L is a positive integer greater than 1. The first updating signaling is used by the N1 for updating a target information set, the updated target information set is an information set of the M information sets. L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s). The second access detection is used by the N1 for determining whether the first frequency sub-band can be used by the N1 for downlink transmission.

In one embodiment, the first signaling is a higher layer signaling.

In one embodiment, the first signaling is an RRC signaling.

In one embodiment, the first signaling is transmitted on the first frequency sub-band.

In one embodiment, the first signaling is transmitted on a frequency band deployed on Licensed Spectrum.

In one embodiment, the second signaling is a physical layer signaling.

In one embodiment, the second signaling is cell-common.

In one embodiment, the second signaling is specific to a terminal group, and the UE is a terminal of the terminal group.

In one embodiment, the second signaling is transmitted on the first frequency sub-band.

In one embodiment, a signaling identifier for the second signaling is CC-RNTI.

In one embodiment, the third signaling is a physical layer signaling.

In one embodiment, the third signaling comprises Downlink Grant DCI.

In one embodiment, the third signaling is transmitted on the first frequency sub-band.

In one embodiment, the third signaling is transmitted on a frequency band deployed on Licensed Spectrum.

In one embodiment, the first frequency sub-band is deployed on Unlicensed Spectrum.

In one embodiment, a number of bits in the first signaling used for indicating any given first-type index in the M information sets is smaller than a number of bits in the first signaling used for indicating a second-type index in a second-type index set corresponding to the given first-type index.

In one embodiment, the second signaling indicates that a first multicarrier symbol group is occupied, the first multicarrier symbol group comprises a positive integer number of multicarrier symbol(s), time domain resources occupied by the third signaling are within the first multicarrier symbol group.

In one subembodiment of the above embodiment, time domain resources occupied by the first radio signal belong to the first multicarrier symbol group.

In one subembodiment of the above embodiment, time domain resources occupied by the first radio signal don't belong to the first multicarrier symbol group.

In one embodiment, all multicarrier symbols between time domain resources occupied by the second signaling and time domain resources occupied by the third signaling are occupied.

In one embodiment, all multicarrier symbols between time domain resources occupied by the second signaling and time domain resources occupied by the first radio signal are occupied.

In one embodiment, the third signaling and the second signaling occupy a same time slice in time domain, the time slice comprises a positive integer number of contiguous multicarrier symbols.

In one embodiment, the third signaling and the second signaling belong to a same search space.

In one subembodiment, the search space is a CORESET.

In one subembodiment, the search space occurs multiple times in time domain.

In one reference embodiment of the above subembodiment, any two adjacent occurrences of the search space in time domain are spaced by an equal time interval.

In one subembodiment, the search space occurs only once in time domain.

In one embodiment, the third signaling comprises a first field, the first field of the third signaling is used by the U2 for determining the first information element out of the first information set, a number of bits comprised by the first field of the third signaling is related to the first information set.

In one subembodiment, the number of bits comprised in the first field of the third signaling is related to a number of information elements comprised in the first information set.

In one embodiment, each of the L downlink signalings is a physical layer signaling.

In one embodiment, each of the L downlink signalings is a dynamic signaling.

In one embodiment, each of the L downlink signalings is cell-common.

In one embodiment, each of the L downlink signalings is specific to a terminal group, and the UE is a terminal of the terminal group.

In one embodiment, any downlink signaling of the L downlink signalings comprises DCI.

In one embodiment, all of the L downlink signalings are transmitted on the first frequency sub-band.

In one embodiment, a signaling identifier for each of the L downlink signalings is CC-RNTI.

In one embodiment, each of the L downlink signalings is DCI identified by a CC-RNTI.

In one embodiment, a CC-RNTI is used for generating an RS sequence of DMRS corresponding to any of the L downlink signalings.

In one embodiment, a CRC bit sequence of any of the L downlink signalings is scrambled by a CC-RNTI.

In one embodiment, the first updating signaling is a physical layer signaling.

In one embodiment, the first updating signaling comprises one or more of CSI, CRI, PMI, RSRP, RSRP or CQI.

In one embodiment, an end time of the second access detection is prior to a start point of time domain resources occupied by the second signaling.

In one embodiment, the second access detection is downlink access detection.

In one embodiment, the second access detection includes performing P energy detections respectively in P time sub-pools on the first frequency sub-band to obtain P detection values respectively; herein, each of P1 detection value(s) out of the P detection values is lower than a second threshold; the P is a positive integer, the P1 is a positive integer no greater than the P.

In one embodiment, the first signaling is transmitted on a downlink physical layer data channel (i.e., a downlink channel capable of carrying physical layer data); the UE receives the first radio signal.

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first signaling is transmitted on a downlink physical layer control channel (i.e., a downlink channel only capable of carrying a physical layer signaling).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the second signaling is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is a sPDCCH.

In one subembodiment, the downlink physical layer control channel is a NR-PDCCH.

In one subembodiment, the downlink physical layer control channel is a NB-PDCCH.

In one embodiment, the third signaling is transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is a sPDCCH.

In one subembodiment, the downlink physical layer control channel is a NR-PDCCH.

In one subembodiment, the downlink physical layer control channel is a NB-PDCCH.

In one embodiment, the first radio signal is transmitted on a downlink physical layer data channel (i.e., a downlink channel capable of carrying physical layer data); the UE receives the first radio signal.

In one subembodiment, the downlink physical layer data channel is a PDSCH.

In one subembodiment, the downlink physical layer data channel is a sPDSCH.

In one subembodiment, the downlink physical layer data channel is a NR-PDSCH.

In one subembodiment, the downlink physical layer data channel is a NB-PDSCH.

In one embodiment, a transmission channel for the first radio signal is a DownLink Shared Channel (DL-SCH); the UE receives the first radio signal.

In one embodiment, the L downlink signalings are respectively transmitted on a downlink physical layer control channel (i.e., a downlink channel only capable of carrying a physical layer signaling).

In one subembodiment, the downlink physical layer control channel is a PDCCH.

In one subembodiment, the downlink physical layer control channel is a sPDCCH.

In one subembodiment, the downlink physical layer control channel is a NR-PDCCH.

In one subembodiment, the downlink physical layer control channel is a NB-PDCCH.

In one embodiment, the first updating signaling is transmitted on an uplink physical layer control channel (i.e., an uplink channel only capable of carrying a physical layer signaling).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the first updating signaling is transmitted on an uplink physical layer data channel (i.e., an uplink channel capable of carrying physical layer data).

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

Embodiment 6

Figure 6:
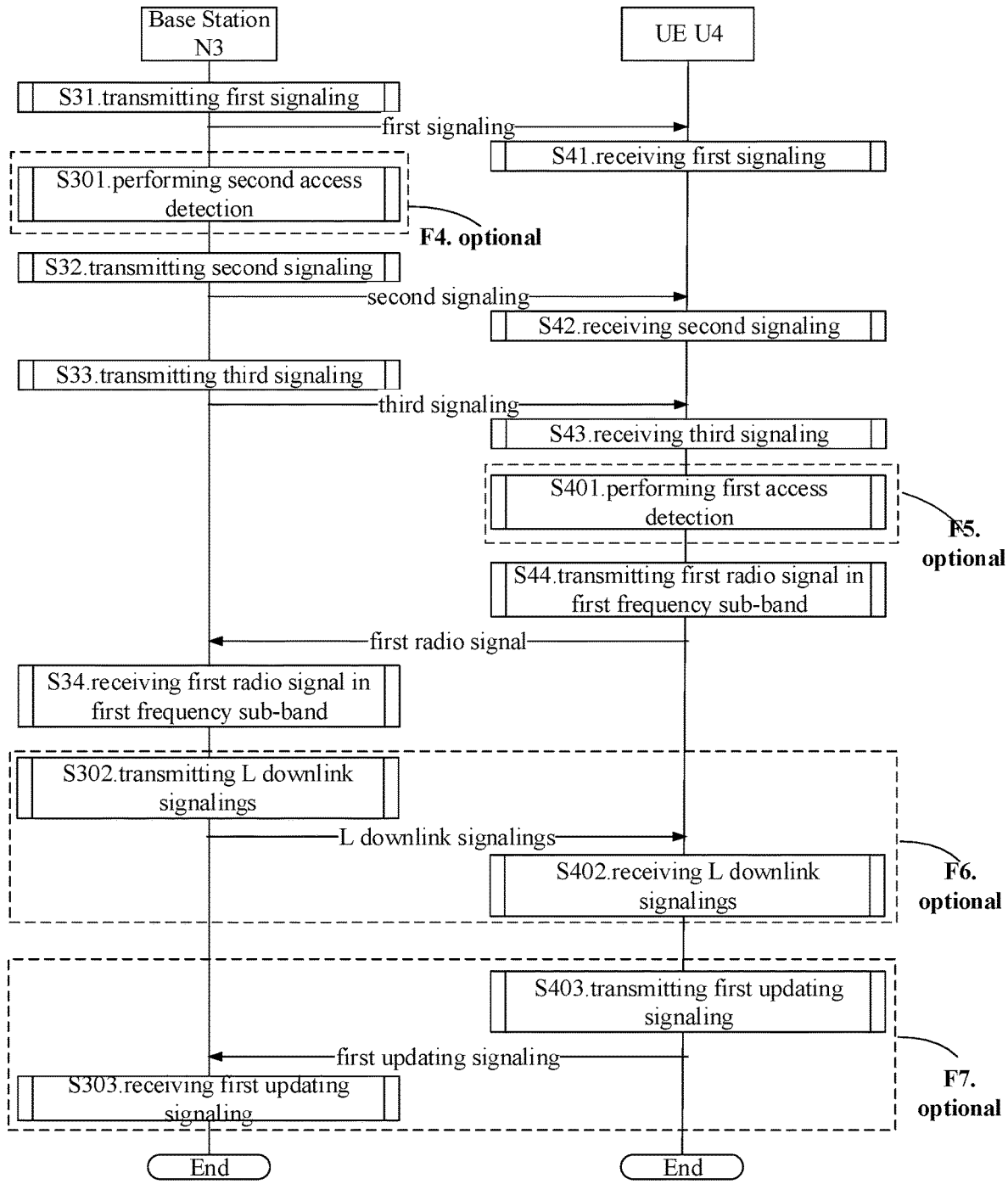
FIG. 6 illustrates a flowchart of wireless transmission according to another embodiment of the present disclosure.

Embodiment 6 illustrates a flowchart of wireless transmission, as shown in FIG. 6. In FIG. 6, a base station N3 is a maintenance base station for a serving cell of a UE U4. In FIG. 6, steps in boxes F4, F5, F6 and F7 are optional, respectively.

The N3 transmits a first signaling in step S31; performs a second access detection in step S301; transmits a second signaling in step S32; transmits a third signaling in step S33; receives a first radio signal in a first frequency sub-band in step S34; transmits L downlink signalings in step S302; and receives a first updating signaling in step S303.

The U4 receives a first signaling in step S41; receives a second signaling in step S42; receives a third signaling in step S43; performs a first access detection in step S401; transmits a first radio signal in a first frequency sub-band in step S44; receives L downlink signalings in step S402; and transmits a first updating signaling in step S403.

In Embodiment 6, the first signaling is used by the U4 for determining M information sets, any information set of the M information sets comprises a positive integer number of information element(s), any information element of the positive integer number of information element(s) comprises a first-type index and a second-type index set, the second-type index set comprises one second-type index or more second-type indices, the M is a positive integer number greater than 1. The second signaling is used by the U4 for determining a first information set out of the M information sets. The third signaling is associated with the second signaling, the third signaling is used by the U4 for determining a first information element out of the first information set. An antenna port group(s) identified by a second-type index(indices) comprised in the first information element is used by the U4 for a transmission of the first radio signal. The third signaling comprises scheduling information of the first radio signal; an antenna port group comprises a positive integer number of antenna port(s). The L downlink signalings respectively indicate that L multicarrier symbol groups are occupied, each multicarrier symbol group of the L multicarrier symbol groups comprises a positive integer number of multicarrier symbol(s), the L is a positive integer greater than 1. The first updating signaling is used by the N3 for updating a target information set, the updated target information set is an information set of the M information sets. L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s). The first access detection is used by the U4 for determining whether the first frequency sub-band can be used by the U4 for uplink transmission. A type of the first access detection is a candidate type of N candidate types; the type of the first access detection and the second signaling are jointly used by the U4 for determining the first information set out of the M information sets. The second access detection is used by the N3 for determining whether the first frequency sub-band can be used by the N3 for downlink transmission.

In one embodiment, the first access detection includes performing Q energy detections respectively in Q time sub-pools of the first frequency sub-band to obtain Q detection values respectively; herein, each of Q1 detection value(s) out of the Q detection values is lower than a first threshold; a value of the Q1 is dependent on the type of the first access detection; the Q is a positive integer, the Q1 is a positive integer no greater than the Q.

In one embodiment, a type of the first access detection is first-type uplink access detection, the Q1 is one of K1 candidate integers; the K1 is a positive integer.

In one embodiment, a type of the first access detection is second-type uplink access detection, the Q1 is equal to 2.

In one embodiment, the first radio signal is transmitted on an uplink physical layer data channel (i.e., an uplink channel capable of carrying physical layer data); the UE transmits the first radio signal.

In one subembodiment, the uplink physical layer data channel is a PUSCH.

In one subembodiment, the uplink physical layer data channel is a sPUSCH.

In one subembodiment, the uplink physical layer data channel is a NR-PUSCH.

In one subembodiment, the uplink physical layer data channel is a NB-PUSCH.

In one embodiment, a transmission channel for the first radio signal is an Uplink Shared Channel (UL-SCH), the UE transmits the first radio signal.

Embodiment 7

Embodiment 7 illustrates a schematic diagram of a first information set, as shown in FIG. 7.

In Embodiment 7, the first information set is one of the M information sets, the M is a positive integer greater than 1. Any information set of the M information sets comprises a positive integer number of information element(s), any information element of the positive integer number of information element(s) comprises a first-type index and a second-type index set, the second-type index set comprises one second-type index or more second-type indices. Any first-type index out of the M information sets is an index of a corresponding information element in an information set to which the corresponding information element belongs. Any second-type index out of the M information sets identifies an antenna port group. A first information element is an information element of the first information set. A first-type index in the first information element is x, the x is a non-negative integer, and the x is smaller than a number of information elements comprised in the first information element. A second-type index set in the first information element comprises two second-type indices, the two second-type indices respectively indicate two antenna port groups.

In FIG. 7, index(indices) of the positive integer number of information element(s) comprised in the first information set is(are) #0, #1 . . . , and #x . . . , respectively; an index of the first information element is #x; the i-th antenna port group comprised in a second-type index set in information element #y is represented by antenna port group #(y, i), where the y and the i are non-negative integers, respectively, and the y is smaller than a number of information elements comprised in the first information set, and the i is smaller than a number of second-type index(indices) comprised in a second-type index set in the information element #y. Two antenna port groups identified by the two second-type indices comprised in the second-type index set in the first information element are antenna port group #(x, 0) and antenna port group #(x, 1), respectively.

In one embodiment, at least two information sets of the M information sets comprise unequal numbers of information elements.

In one embodiment, any two information sets of the M information sets comprise equal numbers of information elements.

In one embodiment, any first-type index out of the M information sets is a non-negative integer.

In one embodiment, any second-type index out of the M information sets is a non-negative integer.

In one embodiment, the antenna port group #(x, 0) is an antenna port group of S1 candidate antenna port groups, and the antenna port group #(x, 1) is an antenna port group of S2 candidate antenna port groups; two second-type indices comprised in a second-type index set in the first information element are respectively an index of the antenna port group #(x, 0) among the S1 candidate antenna port groups and an index of the antenna port group #(x, 1) among the S2 candidate antenna port groups. The S1 and the S2 are positive integers greater than 1, respectively.

In one subembodiment of the above embodiment, at least one of the S1 and the S2 is greater than the number of information elements comprised in the first information set.

In one subembodiment of the above embodiment, both the S1 and the S2 are greater than the number of information elements comprised in the first information set.

In one embodiment, the antenna port group #(x, 0) and the antenna port group #(x, 1) are respectively antenna port groups of S3 candidate antenna port groups; the two second-type indices comprised in the second-type index set in the first information element are respectively an index of the antenna port group #(x, 0) and an index of the antenna port group #(x, 1) among the S3 candidate antenna port groups. The S3 is a positive integer greater than 1.

In one subembodiment of the above embodiment, the S3 is greater than the number of information elements comprised in the first information set.

In one embodiment, the UE of the present disclosure receives the first radio signal of the present disclosure in the first frequency sub-band of the present disclosure; a measurement on the antenna port group #(x, 0) is used for a reception of the first radio signal.

In one embodiment, the UE of the present disclosure transmits the first radio signal of the present disclosure in the first frequency sub-band of the present disclosure; the antenna port group #(x, 0) is used for a transmission of the first radio signal.

In one embodiment, the UE can deduce all or part of multi-antenna-related large-scale properties of the first radio signal from all or part of multi-antenna-related large-scale properties of a radio signal transmitted by the antenna port group #(x, 0).

In one embodiment, the UE can deduce all or part of multi-antenna-unrelated large-scale properties of the first radio signal from all or part of multi-antenna-unrelated large-scale properties of a radio signal transmitted by the antenna port group #(x, 1).

In one embodiment, at least one transmission antenna port for the first radio signal and any antenna port comprised in the antenna port group #(x, 1) are QCL.

In one embodiment, any transmission antenna port for the first radio signal and any antenna port comprised in the antenna port group #(x, 1) are not spatially QCL.

In one embodiment, a number of bits in the first signaling of the present disclosure used for indicating any given first-type index in the M information sets is smaller than a number of bits in the first signaling of the present disclosure used for indicating a second-type index in a second-type index set corresponding to the given first-type index.

In one embodiment, for any given information set of the M information sets, a number of bits in the first signaling used for indicating any first-type index out of the given information set is smaller than a number of bits in the first signaling used for indicating any second-type index out of the given information set.

In one embodiment, a number of bits in the first signaling used for indicating any first-type index in the M information sets is smaller than a number of bits in the first signaling used for indicating any second-type index out of the M information sets.

Embodiment 8

Embodiment 8 illustrates a schematic diagram of a first information set, as shown in FIG. 8.

In Embodiment 8, the first information set is one of the M information sets, the M is a positive integer greater than 1. Any information set of the M information sets comprises a positive integer number of information element(s), any information element of the positive integer number of information element(s) comprises a first-type index and a second-type index set, the second-type index set comprises one second-type index or more second-type indices. Any first-type index out of the M information sets is an index of a corresponding information element in an information set to which the corresponding information element belongs. Any second-type index out of the M information sets identifies an antenna port group. A first information element is an information element of the first information set. A first-type index in the first information element is x, the x is a non-negative integer, and the x is smaller than a number of information elements comprised in the first information element. A second-type index set in the first information element comprises one second-type index, the one second-type index identifies one antenna port group.

In FIG. 8, index(indices) of the positive integer number of information element(s) comprised in the first information set is(are) #0, #1 . . . , and #x . . . , respectively; an index of the first information element is #x; the i-th antenna port group comprised in a second-type index set in information element #y is represented by antenna port group #(y, i), where the y and the i are non-negative integers, respectively, and the y is smaller than a number of information elements comprised in the first information set, and the i is smaller than a number of second-type index(indices) comprised in a second-type index set in the information element #y. The antenna port group identified by the one second-type index comprised in the second-type index set in the first information element is antenna port group #(x, 0).

In one embodiment, the UE of the present disclosure receives the first radio signal of the present disclosure in the first frequency sub-band of the present disclosure; a measurement on the antenna port group #(x, 0) is used for a reception of the first radio signal.

In one embodiment, the UE of the present disclosure transmits the first radio signal of the present disclosure in the first frequency sub-band of the present disclosure; the antenna port group #(x, 0) is used for a transmission of the first radio signal.

Embodiment 9

Figure 9:
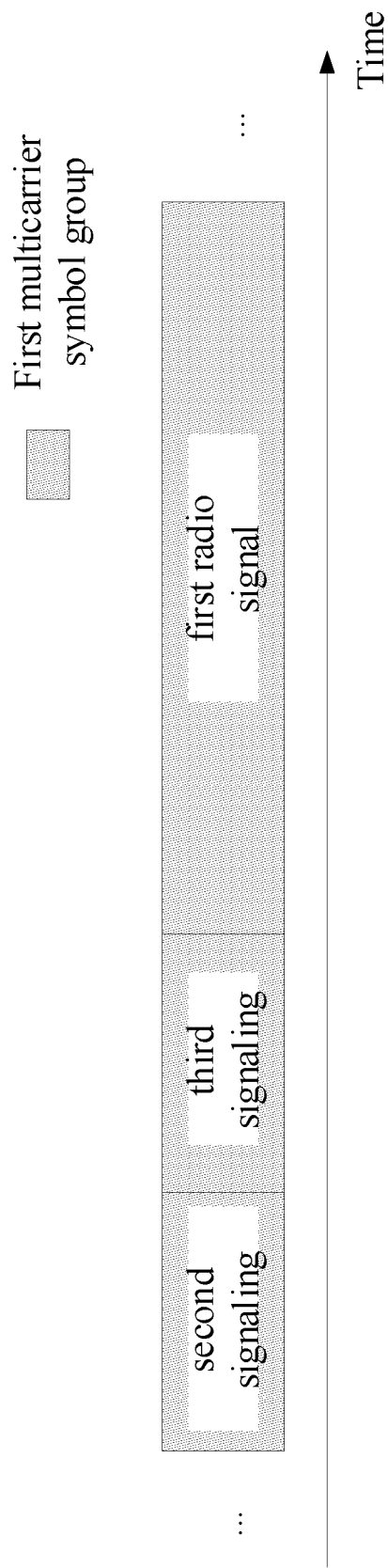
FIG. 9 illustrates a schematic diagram of resource mapping of a second signaling, a third signaling and a first radio signal in time domain according to one embodiment of the present disclosure.

Embodiment 9 illustrates a schematic diagram of resource mapping of a second signaling, a third signaling and a first radio signal in time domain, as shown in FIG. 9.

In Embodiment 9, the second signaling indicates that a first multicarrier symbol group is occupied, the first multicarrier symbol group comprises a positive integer number of multicarrier symbol(s); time domain resources occupied by the second signaling, time domain resources occupied by the third signaling and time domain resources occupied by the first radio signal are all within the first multicarrier symbol group. In FIG. 9, the box filled with slashes represents the first multicarrier symbol group.

In one embodiment, the UE of the present disclosure receives the first radio signal.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, all multicarrier symbols comprised in the first multicarrier symbol group are contiguous.

In one embodiment, the first multicarrier symbol group is occupied by a downlink physical channel or a downlink physical signal.

In one embodiment, the first multicarrier symbol group is occupied by a downlink physical channel or a downlink physical signal transmitted by the base station of the present disclosure.

In one embodiment, all multicarrier symbols comprised in the first multicarrier symbol group belong to a same slot.

In one embodiment, all multicarrier symbols comprised in the first multicarrier symbol group belong to a same subframe.

In one embodiment, the first multicarrier symbol group and time domain resources occupied by the second signaling belong to a same slot.

In one embodiment, the first multicarrier symbol group and time domain resources occupied by the second signaling belong to a same subframe.

In one embodiment, the third signaling and the second signaling belong to a same search space.

In one embodiment, time domain resources occupied by a search space which the second signaling belongs to and time domain resources occupied by a search space which the third signaling belongs to are part of the first multicarrier symbol group.

In one embodiment, the second signaling comprises a second field, the second field of the second signaling indicates that the first multicarrier symbol group is occupied. The second field of the second signaling is a Subframe configuration for LAA field, and the detailed definition of the Subframe configuration for LAA field can be found in 3GPP TS36.213, section 13A.

In one subembodiment of the above embodiment, the second field of the second signaling comprises 4 bits.

Embodiment 10

Figure 10:
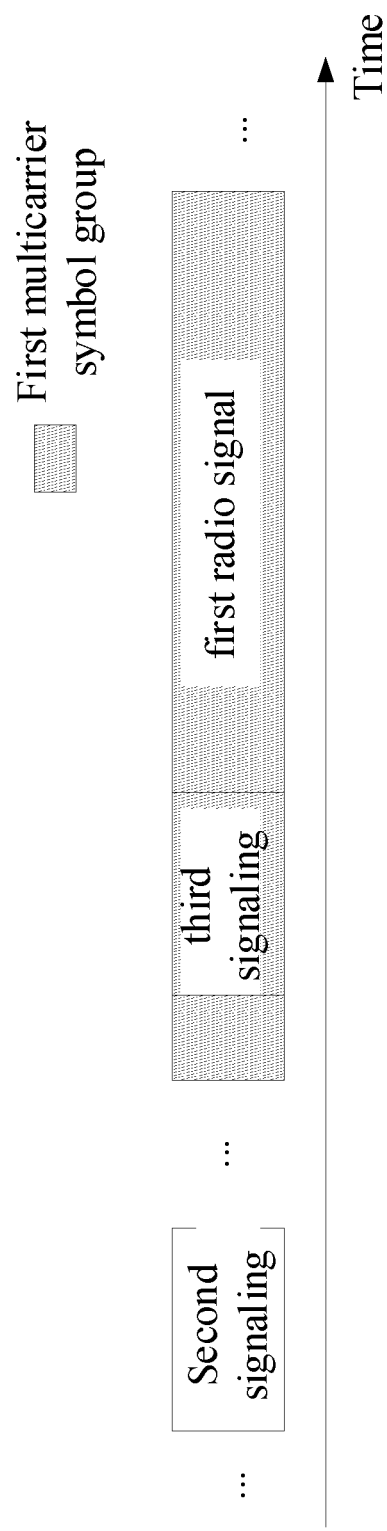
FIG. 10 illustrates a schematic diagram of resource mapping of a second signaling, a third signaling and a first radio signal in time domain according to another embodiment of the present disclosure.

Embodiment 10 illustrates a schematic diagram of resource mapping of a second signaling, a third signaling and a first radio signal in time domain, as shown in FIG. 10.

In Embodiment 10, the second signaling indicates that a first multicarrier symbol group is occupied, the first multicarrier symbol group comprises a positive integer number of multicarrier symbol(s); time domain resources occupied by the third signaling and time domain resources occupied by the first radio signal are within the first multicarrier symbol group. In FIG. 10, the box filled with slashes represents the first multicarrier symbol group.

In one embodiment, the UE of the present disclosure receives the first radio signal.

In one embodiment, the first multicarrier symbol group and time domain resources occupied by the second signaling belong to different slots.

In one embodiment, the first multicarrier symbol group and time domain resources occupied by the second signaling belong to different subframes.

In one embodiment, all multicarrier symbols between time domain resources occupied by the second signaling and time domain resources occupied by the third signaling are occupied.

In one embodiment, all multicarrier symbols between time domain resources occupied by the second signaling and time domain resources occupied by the third signaling are occupied by a downlink physical channel or a downlink physical signal.

In one embodiment, all multicarrier symbols between time domain resources occupied by the second signaling and time domain resources occupied by the third signaling belong to the first multicarrier symbol group.

In one embodiment, all multicarrier symbols between time domain resources occupied by the second signaling and time domain resources occupied by the first radio signal are occupied.

In one embodiment, all multicarrier symbols between time domain resources occupied by the second signaling and time domain resources occupied by the first radio signal are occupied by a downlink physical channel or a downlink physical signal.

In one embodiment, all multicarrier symbols between time domain resources occupied by the second signaling and time domain resources occupied by the first radio signal belong to the first multicarrier symbol group.

In one embodiment, the third signaling and the second signaling occupy a same time slice in time domain.

In one subembodiment, the same time slice comprises 14 contiguous multicarrier symbols.

In one subembodiment, the same time slice belongs to a slot.

In one subembodiment, the same time slice belongs to a sub-frame.

In one subembodiment, the same time slice belongs to a downlink burst.

In one subembodiment, the same time slice belongs to the first multicarrier symbol group.

In one embodiment, all multicarrier symbols between time domain resources occupied by a search space which the second signaling belongs to and time domain resources occupied by a search space which the third signaling belongs to are part of the first multicarrier symbol group.

Embodiment 11

Figure 11:
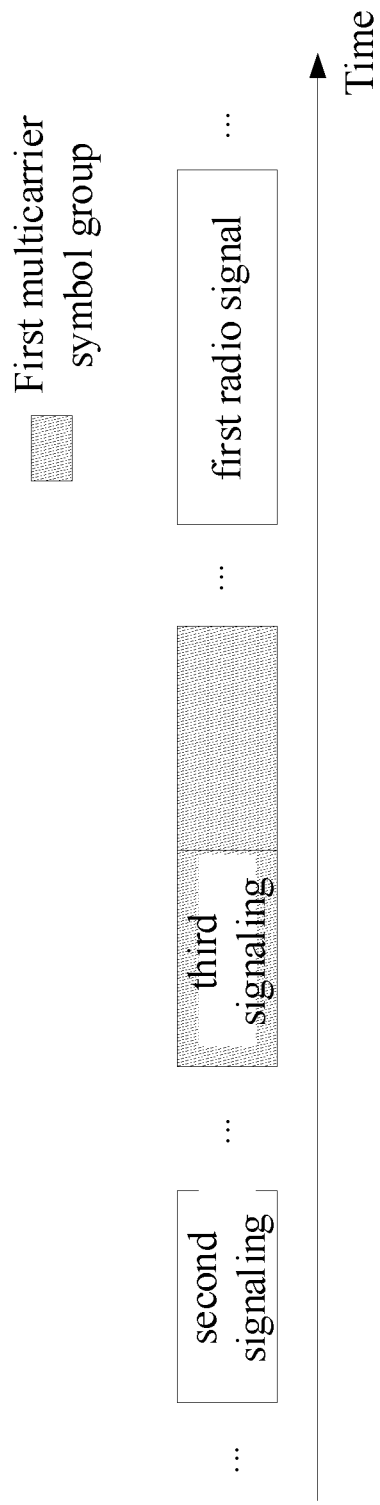
FIG. 11 illustrates a schematic diagram of resource mapping of a second signaling, a third signaling and a first radio signal in time domain according to another embodiment of the present disclosure.

Embodiment 11 illustrates a schematic diagram of resource mapping of a second signaling, a third signaling and a first radio signal in time domain, as shown in FIG. 11.

In Embodiment 11, the second signaling indicates that a first multicarrier symbol group is occupied, the first multicarrier symbol group comprises a positive integer number of multicarrier symbol(s); time domain resources occupied by the third signaling and time domain resources occupied by the first radio signal are within the first multicarrier symbol group, while time domain resources occupied by the first radio signal are outside the first multicarrier symbol group. In FIG. 11, the box filled with slashes represents the first multicarrier symbol group.

In one embodiment, the UE of the present disclosure receives the first radio signal.

In one embodiment, the UE of the present disclosure transmits the first radio signal.

In one embodiment, all multicarrier symbols between time domain resources occupied by the third signaling and time domain resources occupied by the first radio signal are occupied.

In one embodiment, all multicarrier symbols between time domain resources occupied by the third signaling and time domain resources occupied by the first radio signal are occupied by a downlink physical channel or a downlink physical signal.

In one embodiment, all multicarrier symbols between time domain resources occupied by the third signaling and time domain resources occupied by the first radio signal belong to the first multicarrier symbol group.

Embodiment 12

Figure 12:
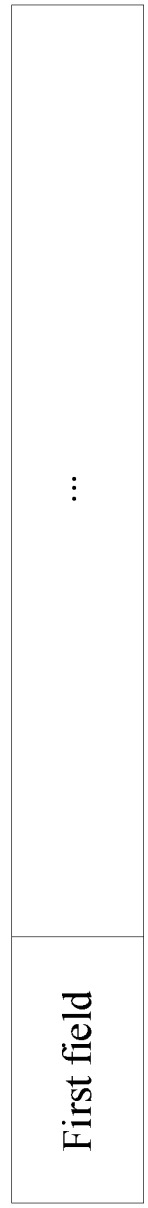
FIG. 12 illustrates a schematic diagram of content of a third signaling according to one embodiment of the present disclosure.

Embodiment 12 illustrates a schematic diagram of content of a third signaling, as shown in FIG. 12.

In Embodiment 12, the third signaling comprises a first field, the first field of the third signaling is used for determining the first information element of the present disclosure out of the first information set of the present disclosure.

In one embodiment, a number of bits comprised in the first field of the third signaling is related to the first information set.

In one embodiment, a number of bits comprised in the first field of the third signaling is related to a number of information elements comprised in the first information set.

In one embodiment, a number of bits comprised in the first field of the third signaling is related to a logarithm of a number of information elements comprised in the first information set to the base 2 being rounded up to a nearest integer value with Math. ceil( ) which means that the number of bits comprised in the first field of the third signaling is equal to A3, the A3 is a positive integer no less than $\log_2(B2)$, and the B2 is the number of information elements comprised in the first information set.

In one embodiment, the first field of the third signaling comprises 1 bit.

In one embodiment, the first field of the third signaling comprises 2 bits.

In one embodiment, the first field of the third signaling comprises 3 bits.

In one embodiment, the first field of the third signaling comprises 4 bits.

In one embodiment, the first field of the third signaling is TCI.

In one embodiment, the first field of the third signaling indicates an index of the first information element in the first information set.

In one embodiment, the third signaling comprises a third field, the third field of the third signaling indicates a type of the first access detection of the present disclosure.

In one subembodiment, the third field of the third signaling is a Channel Access type field.

In one subembodiment, the third field of the third signaling comprises 1 bit.

In one embodiment, a signaling format of the third signaling is one of 0A, 0B, 4A and 4B.

Embodiment 13

Figure 13:
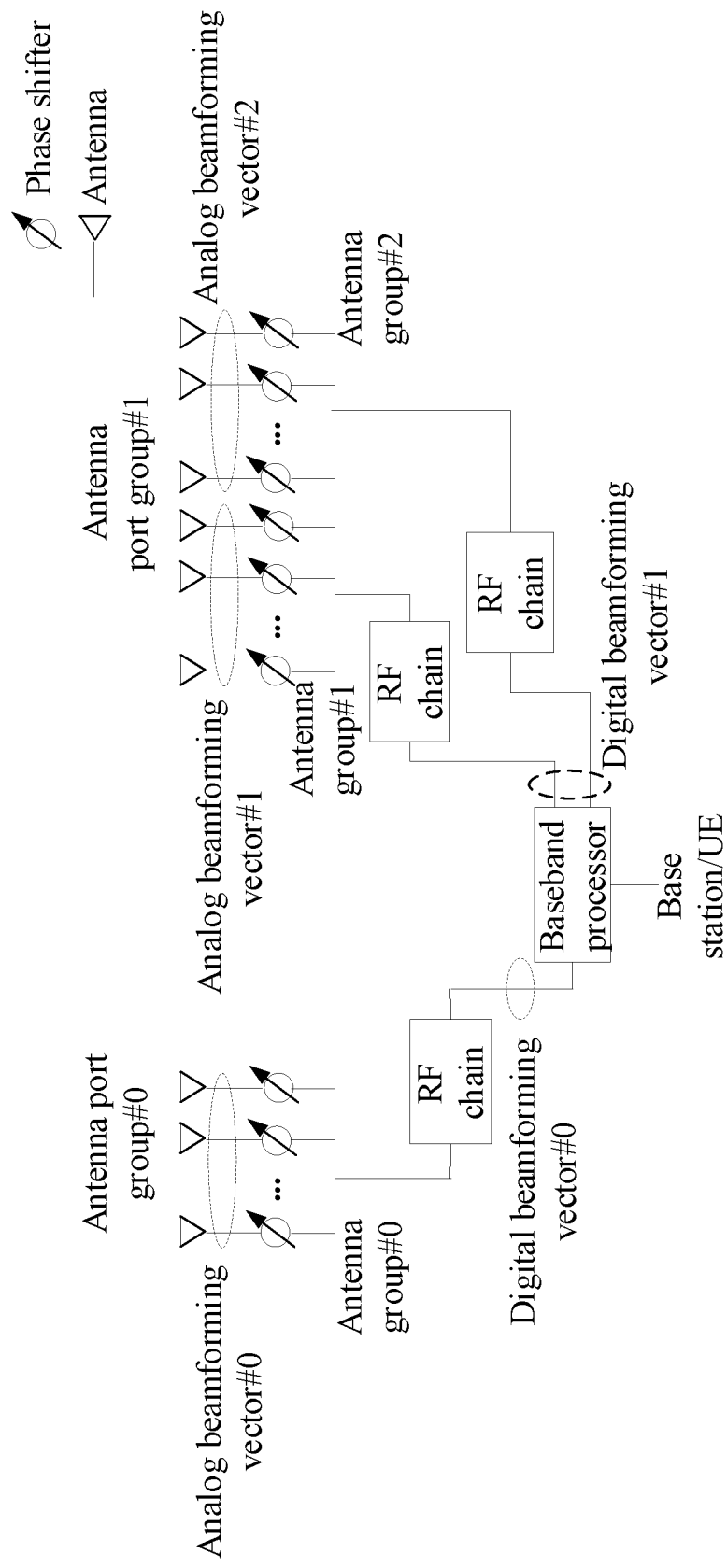
FIG. 13 illustrates a schematic diagram of antenna ports and antenna port groups according to one embodiment of the present disclosure.

Embodiment 13 illustrates a schematic diagram of antenna ports and antenna port groups, as shown in FIG. 13.

In Embodiment 13, an antenna port group comprises a positive integer number of antenna port(s); an antenna port is formed by antennas comprised by a positive integer number of antenna group(s) through antenna virtualization; an antenna group comprises a positive integer number of antenna(s). One antenna group is connected to a baseband processor via a Radio Frequency (RF) chain, so different antenna groups correspond to different RF chains. Mapping coefficients of all antennas in a positive integer number of antenna group(s) comprised by a given antenna port to the given antenna port constitute a beamforming vector corresponding to the given antenna port. Mapping coefficients of multiple antennas comprised by any given antenna group of a positive integer number of antenna group(s) comprised by the given antenna port to the given antenna port constitute an analog beamforming vector of the given antenna group. Analog beamforming vector(s) corresponding to the positive integer number of antenna group(s) is(are) diagonally arranged to constitute an analog beamforming matrix corresponding to the given antenna port. Mapping coefficients of the positive integer number of antenna group(s) to the given antenna port constitute a digital beamforming vector corresponding to the given antenna port. A beamforming vector corresponding to the given antenna port is a product of an analog beamforming matrix and a digital beamforming vector corresponding to the given antenna port. Any two antenna ports comprised in an antenna port group are composed of the same antenna group(s), different antenna ports in a same antenna port group correspond to different beamforming vectors.

FIG. 13 illustrates two antenna port groups: antenna port group #0 and antenna port group #1. Herein, the antenna port group #0 is composed of antenna group #0, while the antenna port group #1 is composed of antenna group #1 and antenna group #2. Mapping coefficients of multiple antennas of the antenna group #0 to the antenna port group #0 constitute an analog beamforming vector #0, and mapping coefficient of the antenna group #0 to the antenna port group #0 constitutes a digital beamforming vector #0. Mapping coefficients of multiple antennas of the antenna group #1 to the antenna port group #1 and of multiple antennas of the antenna group #2 to the antenna port group #1 respectively constitute an analog beamforming vector #1 and an analog beamforming vector #2, and mapping coefficients of the antenna group #1 and the antenna group #2 to the antenna port group #1 constitute a digital beamforming vector #1. A beamforming vector corresponding to any antenna port of the antenna port group #0 is a product of the analog beamforming vector #0 and the digital beamforming vector #0. A beamforming vector corresponding to any antenna port of the antenna port group #1 is a product of the digital beamforming vector #1 and an analog beamforming matrix formed by diagonal arrangement of the analog beamforming vector #1 and the analog beamforming vector #2.

In one embodiment, an antenna port group comprises one antenna port. For example, the antenna port group #0 in FIG. 13 comprises one antenna port.

In one subembodiment of the above embodiment, an analog beamforming matrix corresponding to the antenna port is dimensionally reduced to an analog beamforming vector, while a digital beamforming vector corresponding to the antenna port is dimensionally reduced to a scaler; a beamforming vector corresponding to the antenna port is equal to an analog beamforming vector corresponding to the antenna port. For example, the digital beamforming vector #0 in FIG. 13 is dimensionally reduced to a scaler, a beamforming vector corresponding to the antenna port comprised in the antenna port group #0 is the analog beamforming vector #0.

In one embodiment, an antenna port group comprises multiple antenna ports. For example, the antenna port group #1 in FIG. 13 comprises multiple antenna ports.

In one subembodiment, the multiple antenna ports correspond to a same analog beamforming matrix and different digital beamforming vectors.

In one embodiment, antenna ports in different antenna port groups correspond to different analog beamforming matrixes.

In one embodiment, any two antenna ports of an antenna port group are QCL.

In one embodiment, any two antenna ports of an antenna port group are spatially QCL.

Embodiment 14

Figure 14:
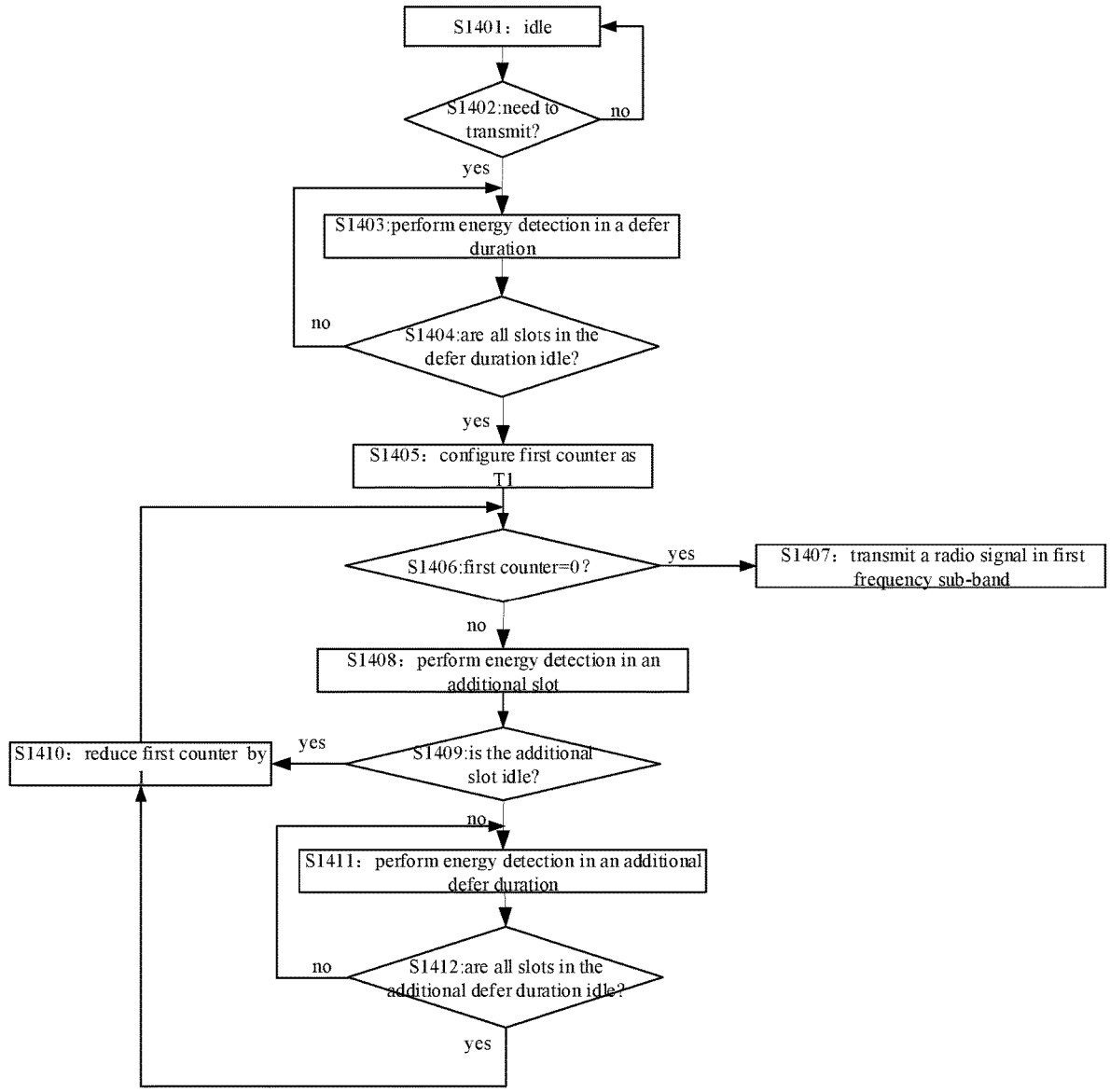
FIG. 14 illustrates a schematic diagram of a given access detection according to one embodiment of the present disclosure, the given access detection is the first access detection of the present disclosure or the second access detection of the present disclosure.

Embodiment 14 illustrates a schematic diagram of a given access detection, as shown in FIG. 14; the given access detection is the first access detection of the present disclosure or the second access detection of the present disclosure.

In Embodiment 14, a given node is idle in step S1401, and determines whether there is need to transmit in step S1402; the given node performs energy detection in a defer duration in step S1403; and determines in step S1404 whether all slots in the defer duration are idle, if yes, move forward to step S1405 to configure a first counter as T1; otherwise, go back to step S1404; the given node determines whether the first counter is 0 in step S1406, if yes, move forward to step S1407 to transmit a radio signal on the first frequency sub-band of the present disclosure; otherwise, proceed to step S1408 to perform energy detection in an additional slot; the given node determines in step S1409 whether the additional slot is idle, if yes, move forward to step S1410 to reduce the first counter by 1 and then go back to step S1406; otherwise, move forward to step S1411 to perform energy detection in an additional defer duration; determines whether all slots in the additional defer duration are idle in step S1412, if yes, go back to step S1410; otherwise go back to step S1411.

In one Embodiment 14, the given access detection is performed on the first frequency sub-band of the present disclosure. The given node performs T energy detections respectively in T time sub-pools on the first frequency sub-band and thus obtains T detection values; herein, each of T1 detection values out of the T detection values is lower than a given threshold. If the given access detection is the first access detection, the given node is the UE of the present disclosure, the T is equal to the Q, and the T1 is equal to the Q1, the given threshold is the first threshold of the present disclosure; if the given access detection is the second access detection, the given node is the base station of the present disclosure, the T is equal to the P, and the T1 is equal to the P1, the given threshold is the second threshold of the present disclosure.

In Embodiment 14, all or part of any first given time sub-pool of the T time sub-pools belongs to a slot in a first given duration, the first given duration is one of all defer durations, all additional slots and all additional defer durations comprised in the given access detection. T1 time sub-pools are time sub-pools out of the T time sub-pools that correspond to the T1 detection values. All or part of any second given time sub-pool of the T1 time sub-pools belongs to a slot in a second given duration, the second given duration is one of all additional slots and all additional defer durations determined to be idle by energy detections in the given access detection.

In one embodiment, the given access detection is LBT, and the specific meaning and way of implementation of the LBT can be found in 3GPP TR36.889.

In one embodiment, the given access detection is a Clear Channel Assessment (CCA), the specific meaning and way of implementation of the CCA can be found in 3GPP TR36.889.

In one embodiment, the given access detection is implemented in a way defined by 3GPP TS36.213, section 15.

In one embodiment, a type of the given access detection is first-type access detection, the T1 is a candidate integer of K candidate integers, the K is a positive integer.

In one subembodiment, the given access detection is the second access detection, the K refers to the K2 of the present disclosure, and the first-type access detection is the first-type downlink access detection of the present disclosure.

In one reference embodiment of the above subembodiment, the first-type access detection is Cat 4 LBT; the detailed definition of the Cat 4 LBT can be found in 3GPP TR36.889.

In one subembodiment, the given access detection is the first access detection, the K refers to the K1 of the present disclosure, and the first-type access detection is the first-type uplink access detection of the present disclosure.

In one reference embodiment of the above subembodiment, the first-type access detection is Type 1 UL channel access procedure; the detailed definition of the Type 1 UL channel access procedure can be found in 3GPP TS36.213, section 15.2.

In one embodiment, the given node selects a value of the T1 at random out of the K candidate integers.

In one embodiment, the given node selects any one of the K candidate integers as a value of the T1 at equal probability.

In one embodiment, the K candidate integers are 0, 1, 2, . . . and K−1.

In one embodiment, the K is $CW_p$, the $CW_p$ is a contention window, and the detailed definition of the $CW_p$ can be found in 3GPP TS36.213, section 15.

In one embodiment, any of the K candidate integers is a non-negative integer.

In one embodiment, the K candidate integers include 0.

In one embodiment, any two of the K candidate integers are unequal.

In one embodiment, the K is a positive integer greater than 1.

In one embodiment, the K belongs to a collection of 3, 7, 15, 31, 63, 127, 255, 511, and 1023.

In one embodiment, a defer duration lasts 16 μs plus a positive integer number of 9 μs.

In one embodiment, a defer duration comprises a plurality of slots.

In one subembodiment of the above embodiment, among the plurality of slots a first slot and a second slot are non-contiguous.

In one subembodiment of the above embodiment, among the plurality of slots a first slot and a second slot are spaced by a time interval of 7 ms.

In one embodiment, an additional defer duration lasts 16 μs plus a positive integer number of 9 μs.

In one embodiment, an additional defer duration comprises a plurality of slots.

In one subembodiment of the above embodiment, among the plurality of slots a first slot and a second slot are non-contiguous.

In one subembodiment of the above embodiment, among the plurality of slots a first slot and a second slot are spaced by a time interval of 7 ms In one embodiment, a slot lasts 9 μs in duration.

In one embodiment, an additional slot lasts 9 μs in duration.

In one embodiment, there is no time sub-pool among the T time sub-pools that is distributed in any two slots of all defer durations, all additional slots and all additional defer durations comprised in the given access detection.

In one embodiment, a first reference duration is any one of all defer durations, all additional slots and all additional defer durations comprised in the given access detection, any slot in the first reference duration comprises all or part of a time sub-pool out of the T time sub-pools.

In one subembodiment of the above embodiment, among the T time sub-pools there do not exist two time sub-pools belonging to a same slot in the first reference duration.

In one embodiment, a second reference duration is any one of all additional slots and all additional defer durations determined to be idle by energy detection in the given access detection, there is one and only slot in the second reference duration that comprises all or part of a time sub-pool of the T1 time sub-pools.

In one subembodiment of the above embodiment, among the T1 time sub-pools there do not exist two time sub-pools belonging to a same slot in the second reference duration.

In one embodiment, performing energy detection in a given time duration means performing energy detection in time sub-pools within the given time duration, the given time duration is one of defer duration, additional slot and additional defer duration, and all the time sub-pools belong to the T time sub-pools.

In one embodiment, the T1 is less than the T.

In one embodiment, among detection value(s) of the T detection values not belonging to the T1 detection values there is at least one detection value lower than the given threshold.

In one embodiment, among detection value(s) of the T detection values not belonging to the T1 detection values there is at least one detection value not lower than the given threshold.

In one embodiment, the T detection values are respectively T received powers or received energies acquired by the given node in T time units by first sensing the power/or energy of all radio signals on the first frequency sub-band and then averaging in time; the T time units are respectively T time durations in the T time sub-pools.

In one subembodiment of the above embodiment, any time unit of the T time units lasts no shorter than 4 μs.

In one embodiment, any given energy detection of the T energy detections means that the given node monitors a received power in a given time unit, the given time unit is a time duration in a time sub-pool of the T time sub-pools that corresponds to the given energy detection.

In one embodiment, any given energy detection of the T energy detections means that the given node monitors a received energy in a given time unit, the given time unit is a consecutive time duration in a time sub-pool of the T time sub-pools that corresponds to the given energy detection.

In one embodiment, any one of the T energy detections is implemented in a way defined by 3GPP TS36.213, section 15.

In one embodiment, any one of the T energy detections is implemented by a mode of energy detection in LTE LAA.

In one embodiment, any one of the T energy detections is an energy detection in the LBT process.

In one embodiment, any one of the T energy detections is an energy detection in the CCA process.

In one embodiment, any one of the T energy detections is implemented by a mode of energy detection in WiFi.

In one embodiment, any one of the T energy detections is implemented by measuring a Received Signal Strength Indication (RSSI).

In one embodiment, time domain resources occupied by any time sub-pool of the T time sub-pools are contiguous.

In one embodiment, the T time sub-pools are mutually orthogonal (non-overlapped) in time domain.

In one embodiment, duration time of any time sub-pool of the T time sub-pools is one of 16 μs and 9 μs.

In one embodiment, there are at least two time sub-pools of the T time sub-pools that are of unequal time durations.

In one embodiment, any two of the T time sub-pools are of equal time duration.

In one embodiment, time domain resources occupied by the T time sub-pools are contiguous.

In one embodiment, there are at least two time sub-pools of the T time sub-pools by which time domain resources occupied are non-contiguous.

In one embodiment, time domain resources occupied by any two of the T time sub-pools are non-contiguous.

In one embodiment, any time sub-pool of the T time sub-pools is a slot.

In one embodiment, any time sub-pool of the T time sub-pools is $T_{sl}$, the $T_{sl}$ is a slot duration, and the detailed definition of the $T_{sl}$ can be found in 3GPP TS36.213, section 15.

In one embodiment, any one of the T time sub-pools other than an earliest time sub-pool is a slot.

In one embodiment, any one of the T time sub-pools other than an earliest time sub-pool is $T_{sl}$, the $T_{sl}$ is a slot duration, and the detailed definition of the $T_{sl}$ can be found in 3GPP TS36.213, section 15.

In one embodiment, there is at least one time sub-pool of a duration of 16 μs among the T time sub-pools.

In one embodiment, there is at least one time sub-pool of a duration of 9 μs among the T time sub-pools.

In one embodiment, an earliest time sub-pool of the T time sub-pools is of a duration of 16 μs.

In one embodiment, a latest time sub-pool of the T time sub-pools is of a duration of 9 μs.

In one embodiment, the T time sub-pools comprise time of listening in Cat 4 LBT.

In one embodiment, the T time sub-pools comprise slots comprised in a defer duration and slots comprised in back-off time in Cat 4 LBT.

In one embodiment, the T time sub-pools comprise slots comprised in a defer duration and slots comprised in back-off time in Type 1 UL channel access procedure, the given access detection is the first access detection.

In one subembodiment, the sensing interval lasts 25 μs.

In one embodiment, the T time sub-pools comprise slots in an initial CCA and an eCCA.

In one embodiment, any two of the T1 time sub-pools are of equal time duration.

In one embodiment, there are at least two time sub-pools of the T1 time sub-pools that are of unequal time durations.

In one embodiment, T1 time sub-pools comprise a latest time sub-pool among the T time sub-pools.

In one embodiment, T1 time sub-pools only comprise slots in an eCCA.

In one embodiment, the T time sub-pools comprise the T1 time sub-pools and T2 time sub-pool(s), and any one of the T2 time sub-pool(s) does not belong to the T1 time sub-pools; the T2 is a positive integer no greater than a difference between the T and the T1.

In one subembodiment, positions of the T2 time sub-pools among the T time sub-pools are continuous.

In one subembodiment, the T2 time sub-pool(s) comprises(comprise) slots in an initial CCA.

In one subembodiment, at least one of the T2 time sub-pool(s) corresponds to a detection value lower than the given threshold.

In one subembodiment, at least one of the T2 time sub-pool(s) corresponds to a detection value not lower than the given threshold.

In one subembodiment, the T2 time sub-pool(s) comprises(comprise) all slots comprised in all defer durations.

In one subembodiment, the T2 time sub-pool(s) comprises(comprise) all slots comprised in at least one additional defer duration.

In one subembodiment, the T2 time sub-pool(s) comprises(comprise) at least one additional slot.

In one subembodiment, the T2 time sub-pool(s) comprises(comprise) all slots comprised in all additional slots and all additional defer durations determined as not idle by energy detection.

In one embodiment, the T1 time sub-pools belong to T1 sub-pool sets respectively, any one of the T1 sub-pool sets comprises a positive integer number of time sub-pool(s) out of the T time sub-pools; any time sub-pool of the T1 sub-pool sets corresponds to a detection value lower than the first threshold.

In one subembodiment, at least one sub-pool set of the T1 sub-pool sets comprises 1 time sub-pool.

In one subembodiment, at least one sub-pool set of the T1 sub-pool sets comprises more than 1 time sub-pool.

In one subembodiment, among the T1 sub-pool sets there are at least two sub-pool sets comprising unequal numbers of time sub-pools.

In one subembodiment, among the T time sub-pools there is no time sub-pool belonging to two of the T1 sub-pool sets at the same time.

In one subembodiment, all time sub-pools in any sub-pool set of the T1 sub-pool sets belong to a same additional defer duration or additional slot that is determined to be idle by energy detection.

In one subembodiment, among time sub-pool(s) of the T time sub-pools not belonging to the T1 sub-pool sets, there is at least one time sub-pool that corresponds to a detection value lower than the given threshold.

In one subembodiment, among time sub-pool(s) of the T time sub-pools not belonging to the T1 sub-pool sets, there is at least one time sub-pool that corresponds to a detection value not lower than the given threshold.

In one embodiment, a first antenna port group is used for determining a multi-antenna-related reception of the given node used to perform the given access detection.

In one subembodiment, the given access detection is the first access detection, the first antenna port group is a transmission antenna port group of the first radio signal.

In one subembodiment, the given access detection is the second access detection, the first antenna port group is an antenna port group marked by a second-type index comprised in the first information set of the present disclosure.

In one subembodiment, the given node can deduce a multi-antenna-related reception used to perform the given access detection from all or part of large-scale properties of a radio signal transmitted by the first antenna port group.

In one subembodiment, a multi-antenna-related transmission of the first antenna port group is used for determining a multi-antenna-related reception of the given node used to perform the given access detection.

Embodiment 15

Figure 15:
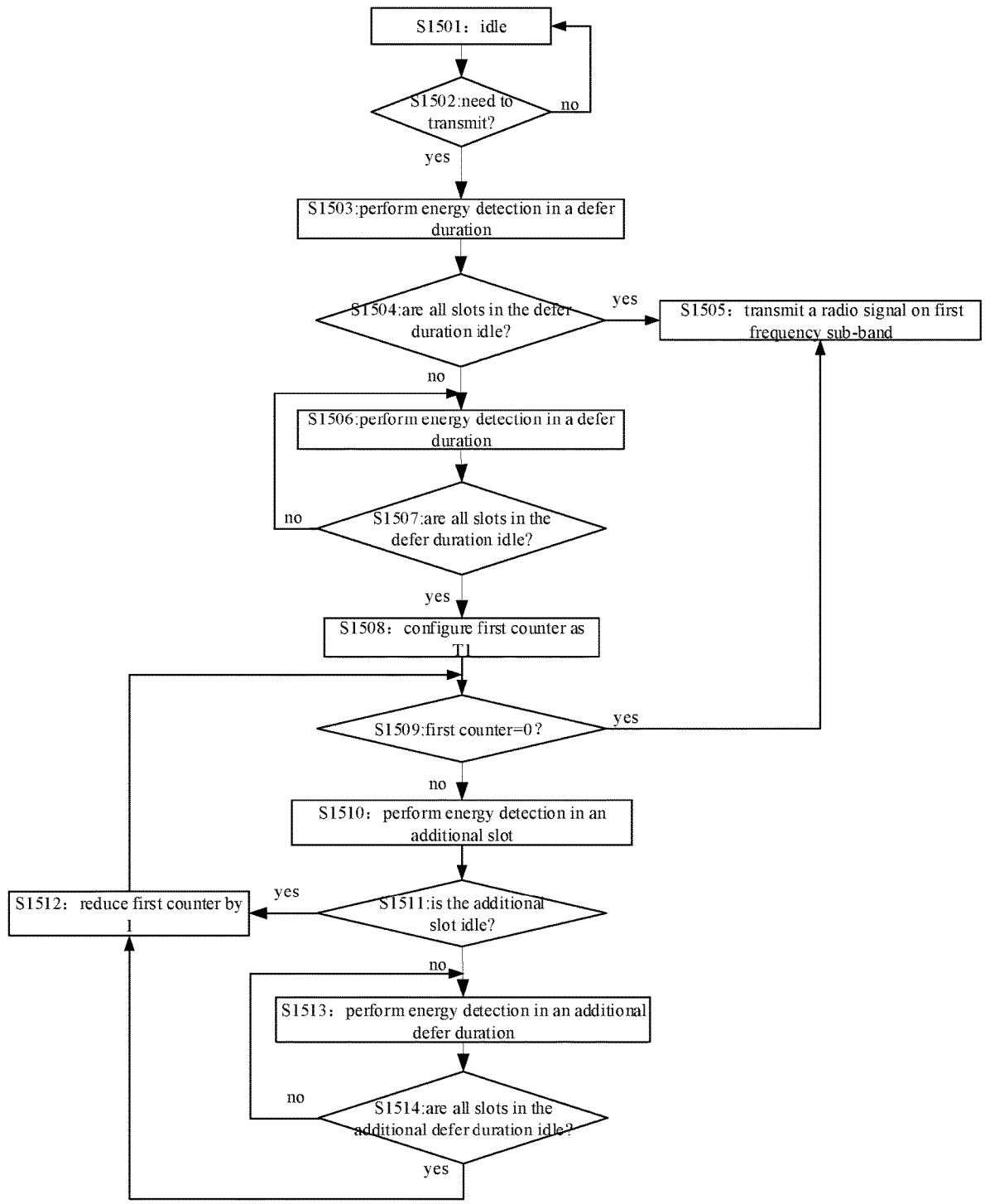
FIG. 15 illustrates a schematic diagram of a given access detection according to another embodiment of the present disclosure, the given access detection is the first access detection of the present disclosure or the second access detection of the present disclosure.

Embodiment 15 illustrates a schematic diagram of a given access detection, as shown in FIG. 15; the given access detection is the first access detection of the present disclosure or is the second access detection of the present disclosure.

In Embodiment 15, a given node is idle in step S1501, and determines whether there is need to transmit in step S1502; the given node performs energy detection in a defer duration in step S1503; and determines in step S1504 whether all slots in the defer duration are idle, if yes, then move forward to step S1505 to transmit a radio signal on the first frequency sub-band; otherwise move forward to step S1506 to perform energy detection in a defer duration; the given node determines in step S1507 whether all slots in the defer duration are idle, if yes, move forward to step S1508 to configure a first counter as T1; otherwise go back to step S1506; the given node determine whether the first counter is 0 in step S1509, if yes, then move back to step S1505 to transmit a radio signal on the first frequency sub-band; otherwise move forward to step S1510 to perform energy detection in an additional slot; the given node determines in step S1511 whether the additional slot is idle, if yes, move forward to step S1512 to reduce the first counter by 1 and the go back to step S1509; otherwise move forward to step S1513 to perform energy detection in an additional defer duration; the given node determines in step S1514 whether all slots in the additional defer duration are idle, if yes, move back to step S1512; otherwise, go back to step S1513.

In Embodiment 15, the given access detection is performed on the first frequency sub-band of the present disclosure. The given node performs T energy detections respectively in T time sub-pools on the first frequency sub-band to obtain T detection values; herein, each of T1 detection values out of the T detection values is lower than a given threshold. If the given access detection is the first access detection, the given node is the UE of the present disclosure, the T is equal to the Q and the T1 is equal to the Q1, the given threshold is the first threshold of the present disclosure; if the given access detection is the second access detection, the given node is the base station of the present disclosure, the T is equal to the P and the T1 is equal to the P1, the given threshold is the second threshold of the present disclosure.

In Embodiment 15, all or part of any first given time sub-pool of the T time sub-pools belongs to a slot in a first given duration, the first given duration is one of all defer durations, all additional slots and all additional defer durations comprised in the given access detection. T1 time sub-pools are time sub-pools out of the T time sub-pools that correspond to the T1 detection values. All or part of any second given time sub-pool of the T1 time sub-pools belongs to a slot in a second given duration, the second given duration is one of all additional slots and all additional defer durations determined to be idle by energy detections in the given access detection.

In one embodiment, a type of the given access detection is first-type access detection.

In one subembodiment, the given access detection is the second access detection, the first-type access detection is the first-type downlink access detection of the present disclosure.

In one reference embodiment of the above subembodiment, the first-type access detection is Cat 4 LBT, and the detailed definition of the Cat 4 LBT can be found in 3GPP TR36.889.

In one subembodiment, the given access detection is the first access detection, the first-type access detection is the first-type uplink access detection of the present disclosure.

In one reference embodiment of the above subembodiment, the first-type access detection is Type 1 UL channel access procedure, and the detailed definition of the Type 1 UL channel access procedure can be found in 3GPP TS36.213, section 15.2.

In one embodiment, the T1 is equal to 0, the given node determines in step S1504 that all slots in the defer duration are idle.

In one embodiment, the T1 is a candidate integer of the K candidate integers, the K is a positive integer; the given node determines in step S1504 that not all slots in the defer duration are idle.

In one subembodiment, the given access detection is the second access detection, the K is the K2 of the present disclosure.

In one subembodiment, the given access detection is the first access detection, the K is the K1 of the present disclosure.

Embodiment 16

Figure 16:
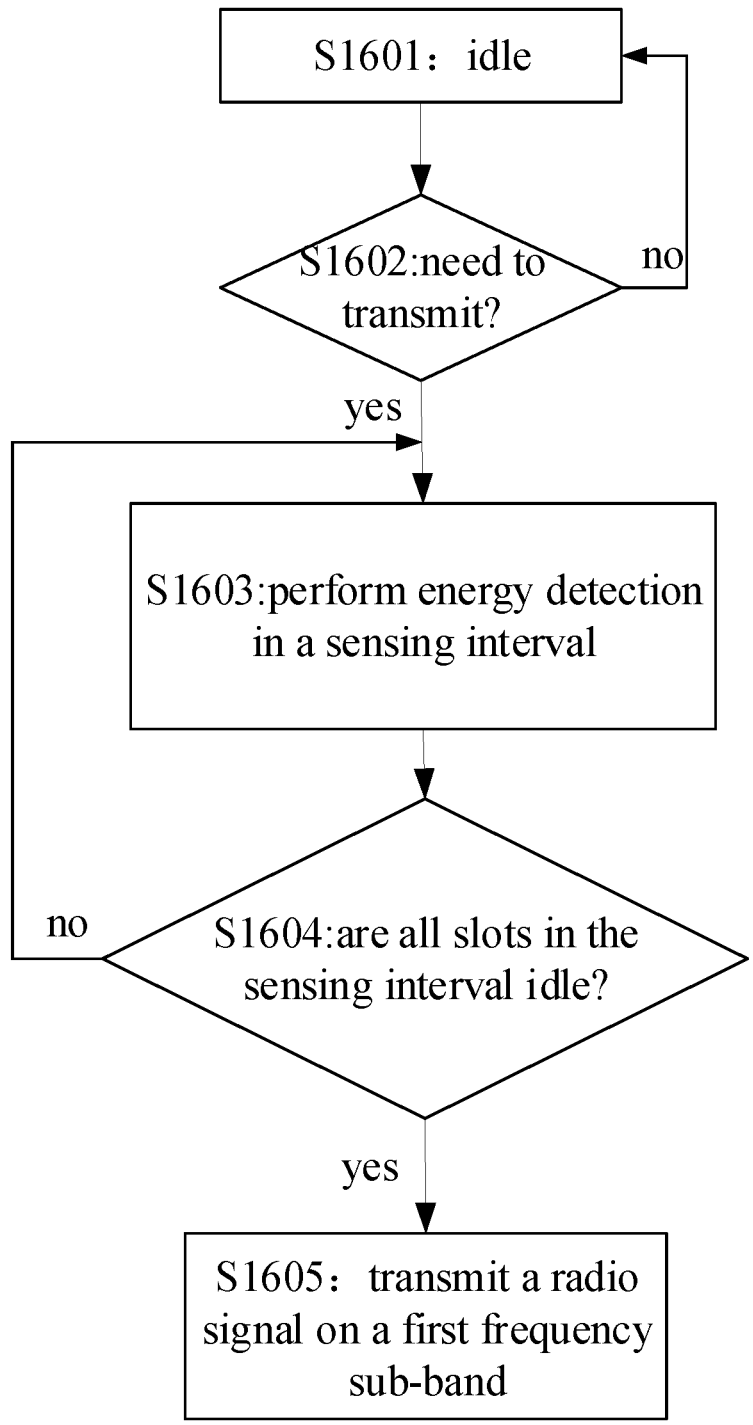
FIG. 16 illustrates a schematic diagram of a given access detection according to another embodiment of the present disclosure, the given access detection is the first access detection of the present disclosure or the second access detection of the present disclosure.

Embodiment 16 illustrates a schematic diagram of a given access detection, as shown in FIG. 16; the given access detection is the first access detection of the present disclosure or is the second access detection of the present disclosure.

In Embodiment 16, a given node is idle in step S1601, and determines whether there is need to transmit in step S1602; performs energy detection in a sensing interval in step S1603; and determines in step S1604 whether all slots in the sensing interval are idle, if yes, move forward to step S1605 to transmits a radio signal on the first frequency sub-band; otherwise, go back to step S1603.

In Embodiment 16, the given access detection is performed on the first frequency sub-band of the present disclosure. The given node performs T energy detections respectively in T time sub-pools on the first frequency sub-band to obtain T detection values; herein, each of T1 detection values out of the T detection values is lower than a given threshold. If the given access detection is the first access detection, the given node is the UE of the present disclosure, the T is equal to the Q and the T1 is equal to the Q1, the given threshold is the first threshold of the present disclosure; if the given access detection is the second access detection, the given node is the base station of the present disclosure, the T is equal to the P and the T1 is equal to the P1, the given threshold is the second threshold of the present disclosure.

In Embodiment 16, all or part of any first given time sub-pool of the T time sub-pools belongs to a slot comprised in a sensing interval in the given access detection. T1 time sub-pools are respectively time sub-pools of the T time sub-pools that correspond to the T1 detection values. All or part of any second given time sub-pool of the T1 time sub-pools belongs to a slot comprised in a sensing interval determined to be idle through energy detection in the given access detection.

In one embodiment, the Q1 is equal to 2.
In one embodiment, the Q1 is equal to the Q.
In one embodiment, the Q1 is greater than the Q.
In one embodiment, a sensing interval lasts 25 μs.
In one embodiment, a sensing interval comprises 2 slots, and the 2 slots are not contiguous in time domain.
In one subembodiment, a time interval between the 2 slots is 7 μs.

In one embodiment, the T time sub-pools comprise listening time in Cat 2 LBT.

In one embodiment, the T time sub-pools comprise slots comprised in a sensing interval of Type 2 UL channel access procedure, the detailed definition of the sensing interval can be found in 3GPP TS36.213, section 15.2.

In one embodiment, the T time sub-pools comprise $T_f$ and $T_{sl}$ comprised in a sensing interval of Type 2 UL channel access procedure, where the $T_f$ and $T_{sl}$ are time intervals, and the detailed definition of the $T_f$ and $T_{sl}$ can be found in 3GPP TS36.213, section 15.2.

In one subembodiment of the above embodiment, the $T_f$ lasts 16 μs.

In one subembodiment of the above embodiment, the $T_{sl}$ lasts 9 μs.

In one embodiment, the given access detection is second-type access detection.

In one subembodiment, the given access detection is the second access detection, the second-type access detection is the second-type downlink access detection of the present disclosure.

In one reference embodiment of the above sub embodiment, the second-type access detection is Cat 2 LBT, the detailed definition of the Cat 2 LBT can be found in 3GPP TR36.889.

In one subembodiment, the given access detection is the first access detection, the second-type access detection is the second-type uplink access detection of the present disclosure.

In one reference embodiment of the above subembodiment, the second-type access detection is Type 2 UL channel access procedure, and the detailed definition of the Type 2 UL channel access procedure can be found in 3GPP TS36.213, section 15.2.

In one embodiment, a first time sub-pool of the T1 time sub-pools lasts 16 μs, while a second time sub-pool of the T1 time sub-pools lasts 9 μs.

In one embodiment, each of the T1 time sub-pools lasts 9 μs; and a time interval between a first time sub-pool and a second time sub-pool of the T1 time sub-pools is 7 μs.

Embodiment 17

Figure 17:
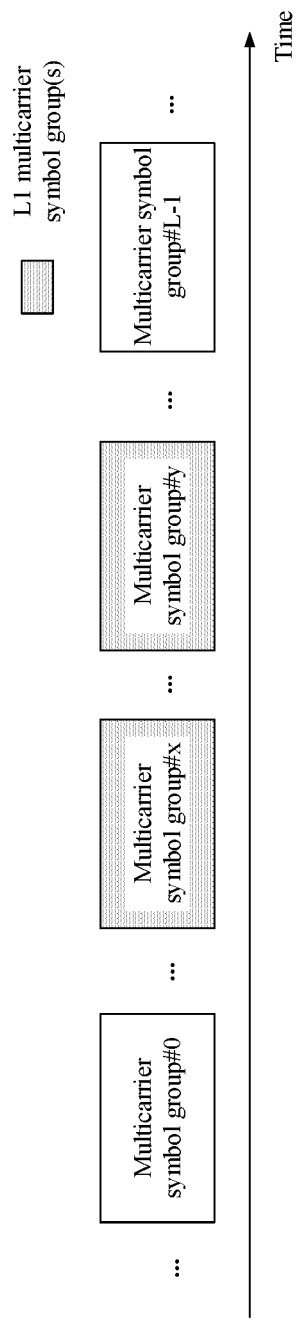
FIG. 17 illustrates a schematic diagram of L multicarrier symbol groups and L1 multicarrier symbol group(s) according to one embodiment of the present disclosure.

Embodiment 17 illustrates a schematic diagram of L multicarrier symbol groups and L1 multicarrier symbol group(s), as shown in FIG. 17.

In Embodiment 17, the L multicarrier symbol groups are respectively indicated by the L downlink signalings of the present disclosure. The L1 multicarrier symbol group(s) is(are) a subset of the L multicarrier symbol groups, L1 downlink signaling(s) is(are) downlink signaling(s) out of the L downlink signalings indicating the L1 multicarrier symbol group(s). A measurement used for generating the first updating signaling of the present disclosure is limited to the L1 multicarrier symbol group(s). The first updating signaling is used for updating a target information set, the updated target information set is one of the M information sets of the present disclosure. Each of the L multicarrier symbol groups comprises a positive integer number of multicarrier symbol(s). In FIG. 17, indices of the L multicarrier symbol groups are #0, #1, . . . and #L−1, respectively. A slash-filled box represents each of the L1 multicarrier symbol group(s). 'x' and 'y' in FIG. 17 are respectively non-negative integers less than the L, and the x is less than the y.

In one embodiment, all multicarrier symbols comprised in any multicarrier symbol group of the L multicarrier symbol groups are contiguous.

In one embodiment, any downlink signaling of the L downlink signalings indicates that a corresponding multicarrier symbol group is occupied by a downlink physical channel or a downlink physical signal.

In one embodiment, all multicarrier symbols comprised in any multicarrier symbol group of the L multicarrier symbol groups belong to a same slot.

In one embodiment, all multicarrier symbols comprised in any multicarrier symbol group of the L multicarrier symbol groups belong to a same subframe.

In one embodiment, the first updating signaling comprises one or more of CSI, CRI, PMI, RSRP, RSRP or CQI.

In one embodiment, a measurement on a first reference signal is used for generating the first updating signaling, time domain resources occupied by the first reference signal belong to the L1 multicarrier symbol group(s).

In one subembodiment of the above embodiment, the first reference signal does not occupy any time domain resources other than the L1 multicarrier symbol group(s).

In one subembodiment of the above embodiment, the first reference signal includes one or more of a CSI-RS, a Primary Synchronization Signal (PSS), a Secondary Synchronization Signal (SSS), a Master Information Block (MIB)/System Information Block (SIB), DMRS, a TRS or PTRS.

In one subembodiment of the above embodiment, at least one antenna port of a transmission antenna port group of the first reference signal is QCL with any antenna port of a first antenna port group; the first antenna port group is an antenna port group identified by a second-type index corresponding to an information element to be updated which is comprised by the updated target information set.

In one subembodiment of the above embodiment, at least one antenna port of a transmission antenna port group of the first reference signal is spatially QCL with any antenna port of a first antenna port group; the first antenna port group is an antenna port group identified by a second-type index corresponding to an information element to be updated which is comprised by the updated target information set.

In one subembodiment of the above embodiment, the first reference signal comprises L1 sub-reference signal(s), time domain resources occupied by the L1 sub-reference signal(s) respectively belongs(belong) to the L1 multicarrier symbol group(s).

In one subembodiment of the above embodiment, an average value of measurement(s) on the L1 sub-reference signal(s) is used for generating the first updating signaling.

In one embodiment, the L multicarrier symbol groups are mutually orthogonal (non-overlapped), namely, there isn't any multicarrier symbol belonging to two of the L multicarrier symbol groups simultaneously.

Embodiment 18

Figure 18:
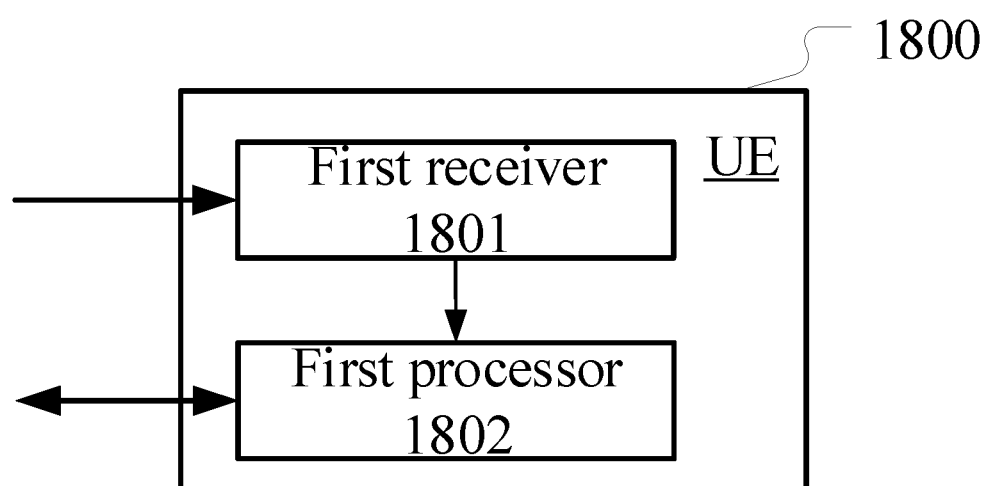
FIG. 18 illustrates a structure block diagram of a processing device in a UE according to one embodiment of the present disclosure.

Embodiment 18 illustrates a structure block diagram of a processing device in a UE, as shown in FIG. 18. In FIG. 18, the UE processing device 1800 is mainly composed of a first receiver 1801 and a first processor 1802.

In Embodiment 18, the first receiver 1801 receives a first signaling, a second signaling and a third signaling; the first processor 1802 receives a first radio signal in a first frequency sub-band or transmits a first radio signal in a first frequency sub-band.

In Embodiment 18, the first signaling is used by the first receiver 1801 for determining M information sets, any information set of the M information sets comprises a positive integer number of information element(s), any information element of the positive integer number of information element(s) comprises a first-type index and a second-type index set, the second-type index set comprises one second-type index or more second-type indices; the second signaling is used by the first receiver 1801 for determining a first information set out of the M information sets; the third signaling is associated with the second signaling, and the third signaling is used by the first receiver 1801 for determining a first information element out of the first information set. The first processor 1802 receives the first radio signal in the first frequency sub-band, (a) measurement(s) on (an) antenna port group(s) identified by (a) second-type index(indices) comprised in the first information element is(are) used by the first processor 1802 for a reception of the first radio signal; or, the first processor 1802 transmits the first radio signal in a first frequency sub-band, (an) antenna port group(s) identified by (a) second-type index(indices) comprised in the first information element is(are) used by the first processor 1802 for a transmission of the first radio signal. The third signaling comprises scheduling information of the first radio signal, the M is a positive integer greater than 1; an antenna port group comprises a positive integer number of antenna port(s).

In one embodiment, a number of bits in the first signaling used for indicating any given first-type index in the M information sets is smaller than a number of bits in the first signaling used for indicating a second-type index in a second-type index set corresponding to the given first-type index.

In one embodiment, the second signaling indicates that a first multicarrier symbol group is occupied, the first multicarrier symbol group comprises a positive integer number of multicarrier symbol(s); time domain resources occupied by the third signaling are within the first multicarrier symbol group.

In one embodiment, all multicarrier symbols between time domain resources occupied by the second signaling and time domain resources occupied by the third signaling are occupied.

In one embodiment, all multicarrier symbols between time domain resources occupied by the second signaling and time domain resources occupied by the first radio signal are occupied, the first processor 1802 receives the first radio signal in the first frequency sub-band.

In one embodiment, the third signaling and the second signaling occupy a same time slice in time domain, the time slice comprises a positive integer number of contiguous multicarrier symbols.

In one embodiment, the third signaling and the second signaling belong to a same search space.

In one embodiment, the third signaling comprises a first field, the first field of the third signaling is used for determining the first information element out of the first information set, a number of bits comprised by the first field of the third signaling is related to the first information set.

In one embodiment, the first receiver 1801 also receives L downlink signalings, the L downlink signalings respectively indicate that L multicarrier symbol groups are occupied, each multicarrier symbol group of the L multicarrier symbol groups comprises a positive integer number of multicarrier symbol(s), the L is a positive integer greater than 1. The first processor 1802 also transmits a first updating signaling, the first updating signaling is used for updating a target information set, the updated target information set is an information set of the M information sets. Herein, L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

In one embodiment, the first receiver 1801 also performs a first access detection on the first frequency sub-band; herein, the first processor 1802 transmits the first radio signal in the first frequency sub-band; a type of the first access detection is a candidate type of N candidate types; the type of the first access detection and the second signaling are jointly used by the first receiver 1801 for determining the first information set out of the M information sets; the first access detection includes:

performing Q energy detections respectively in Q time sub-pools of the first frequency sub-band to obtain Q detection values respectively;

herein, each of Q1 detection value(s) out of the Q detection values is lower than a first threshold; a value of the Q1 is dependent on the type of the first access detection; the Q is a positive integer, the Q1 is a positive integer no greater than the Q.

In one subembodiment, a type of the first access detection is first-type uplink access detection, the Q1 is one of K1 candidate integers; the K1 is a positive integer.

In one subembodiment, a type of the first access detection is second-type uplink access detection, the Q1 is equal to 2.

In one embodiment, the first receiver 1801 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 1802 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 19

Figure 19:
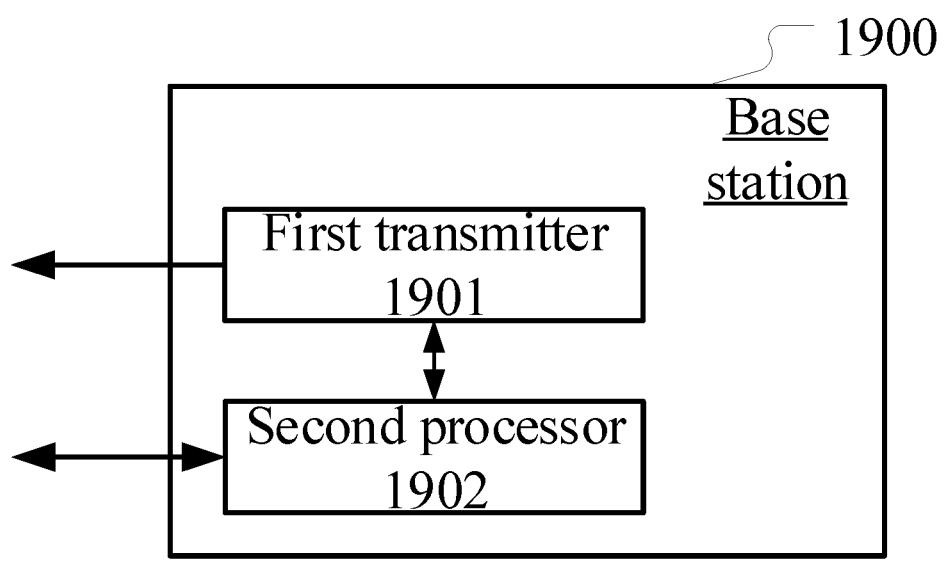
FIG. 19 illustrates a structure block diagram of a processing device in a base station according to one embodiment of the present disclosure.

Embodiment 19 illustrates a structure block diagram of a processing device in a base station, as shown in FIG. 19. In FIG. 19, the processing device 1900 in the base station is mainly composed of a first transmitter 1901 and a second processor 1902.

In Embodiment 19, the first transmitter 1901 transmits a first signaling, a second signaling and a third signaling; the second processor 1902 transmits a first radio signal in a first frequency sub-band or receives a first radio signal in a first frequency sub-band.

In Embodiment 19, the first signaling is used for determining M information sets, any information set of the M information sets comprises a positive integer number of information element(s), any information element of the positive integer number of information element(s) comprises a first-type index and a second-type index set, the second-type index set comprises one second-type index or more second-type indices; the second signaling is used for determining a first information set out of the M information sets; the third signaling is associated with the second signaling, the third signaling is used for determining a first information element out of the first information set. The second processor 1902 transmits the first radio signal in the first frequency sub-band, (a) measurement(s) on (an) antenna port group(s) identified by (a) second-type index (indices) comprised in the first information element is(are) used for a reception of the first radio signal; or, the second processor 1902 receives the first radio signal in the first frequency sub-band, (a) measurement(s) on (an) antenna port group(s) identified by (a) second-type index(indices) comprised in the first information element is(are) used for a transmission of the first radio signal. The third signaling comprises scheduling information of the first radio signal, the M is a positive integer greater than 1; an antenna port group comprises a positive integer number of antenna port(s).

In one embodiment, a number of bits in the first signaling used for indicating any given first-type index in the M information sets is smaller than a number of bits in the first signaling used for indicating a second-type index in a second-type index set corresponding to the given first-type index.

In one embodiment, the second signaling indicates that a first multicarrier symbol group is occupied, the first multicarrier symbol group comprises a positive integer number of multicarrier symbol(s); time domain resources occupied by the third signaling are within the first multicarrier symbol group.

In one embodiment, all multicarrier symbols between time domain resources occupied by the second signaling and time domain resources occupied by the third signaling are occupied.

In one embodiment, all multicarrier symbols between time domain resources occupied by the second signaling and time domain resources occupied by the first radio signal are occupied, the second processor 1902 transmits the first radio signal in the first frequency sub-band.

In one embodiment, the third signaling and the second signaling occupy a same time slice in time domain, the time slice comprises a positive integer number of contiguous multicarrier symbols.

In one embodiment, the third signaling and the second signaling belong to a same search space.

In one embodiment, the third signaling comprises a first field, the first field of the third signaling is used for determining the first information element out of the first information set, a number of bits comprised by the first field of the third signaling is related to the first information set.

In one embodiment, the first transmitter 1901 also determines a type of a first access detection; herein, the second processor 1902 receives the first radio signal in the first frequency sub-band; a transmitter of the first radio signal performs the first access detection on the first frequency sub-band before transmitting the first radio signal; the type of the first access detection is a candidate type of N candidate types; the type of the first access detection and the second signaling are jointly used for determining the first information set out of the M information sets.

In one embodiment, the first transmitter 1901 also transmits L downlink signalings, the L downlink signalings respectively indicate that L multicarrier symbol groups are occupied, each multicarrier symbol group of the L multicarrier symbol groups comprises a positive integer number of multicarrier symbol(s), the L is a positive integer greater than 1. The second processor 1902 also receives a first updating signaling, the first updating signaling is used by the second processor 1902 for updating a target information set, the updated target information set is an information set of the M information sets. Herein, L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

In one embodiment, the second processor 1902 also performs a second access detection on the first frequency sub-band; herein, the second access detection includes:

performing P energy detections respectively in P time sub-pools on the first frequency sub-band to obtain P detection values respectively;

herein, each of P1 detection value(s) out of the P detection values is lower than a second threshold, the P is a positive integer, the P1 is a positive integer no greater than the P.

In one embodiment, the first transmitter 1901 comprises at least one of the antenna 420, the transmitter 418, the transmitting processor 416, the multi-antenna transmitting processor 471, the controller/processor 475 or the memory 476 in Embodiment 4.

In one embodiment, the second processor 1902 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or network side equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a user equipment (UE) for wireless communications, comprising:
   receiving a first signaling, the first signaling being used for determining M information sets, any information set of the M information sets comprising a positive integer number of information element(s), any information element of the positive integer number of information element(s) comprising a first-type index and a second-type index set, the second-type index set comprising one second-type index or more second-type indices, and the M being a positive integer greater than 1;
   receiving a second signaling, the second signaling being used for determining a first information set out of the M information sets;
   receiving a third signaling, the third signaling being associated with the second signaling, and the third signaling being used for determining a first information element out of the first information set; and
   receiving a first radio signal in a first frequency sub-band, (a) measurement(s) on (an) antenna port group(s) identified by (a) second-type index(indices) comprised in the first information element being used for a reception of the first radio signal; or, transmitting a first radio signal in a first frequency sub-band, (an) antenna port group(s) identified by (a) second-type index(indices) comprised in the first information element being used for a transmission of the first radio signal;
   wherein the third signaling comprises scheduling information of the first radio signal, and an antenna port group comprises a positive integer number of antenna port(s).

2. The method according to claim 1, wherein a number of bits in the first signaling used for indicating any one given first-type index in the M information sets is smaller than a number of bits in the first signaling used for indicating a second-type index in a second-type index set corresponding to the given first-type index;
   or, the third signaling comprises a first field, the first field of the third signaling is used for determining the first information element out of the first information set, a number of bits comprised by the first field of the third signaling is related to the first information set.

3. The method according to claim 1, wherein the second signaling indicates that a first multicarrier symbol group is occupied, the first multicarrier symbol group comprises a positive integer number of multicarrier symbol(s), time domain resources occupied by the third signaling are within the first multicarrier symbol group;
   or, all multicarrier symbols between time domain resources occupied by the second signaling and time domain resources occupied by the third signaling are occupied;
   or, all multicarrier symbols between time domain resources occupied by the second signaling and time domain resources occupied by the first radio signal are occupied, the UE receives the first radio signal in the first frequency sub-band;

or, the third signaling and the second signaling occupy a same time slice in time domain, the time slice comprises a positive integer number of contiguous multicarrier symbols;

or, the third signaling and the second signaling belong to a same search space.

4. The method according to claim 1, comprising:
performing a first access detection on the first frequency sub-band;
wherein the UE transmits the first radio signal in the first frequency sub-band; a type of the first access detection is a candidate type of N candidate types; the type of the first access detection and the second signaling are jointly used for determining the first information set out of the M information sets; the first access detection includes:
performing Q energy detections respectively in Q time sub-pools on the first frequency sub-band to obtain Q detection values respectively;
wherein each of Q1 detection value(s) out of the Q detection values is lower than a first threshold; a value of the Q1 is dependent on the type of the first access detection; the Q is a positive integer, the Q1 is a positive integer no greater than the Q.

5. The method according to claim 4, wherein the type of the first access detection is a first-type uplink access detection, the Q1 is a candidate integer of K1 candidate integers; the K1 is a positive integer;
or, the type of the first access detection is a second-type uplink access detection, the Q1 is equal to 2.

6. The method according to claim 1, comprising:
receiving L downlink signalings, the L downlink signalings respectively indicating that L multicarrier symbol groups are occupied, each multicarrier symbol group of the L multicarrier symbol groups comprising a positive integer number of multicarrier symbol(s), the L being a positive integer greater than 1; and
transmitting a first updating signaling, the first updating signaling being used for updating a target information set, the updated target information set being an information set of the M information sets;
wherein L1 multicarrier symbol group(s) respectively corresponds(correspond) to L1 downlink signaling(s), the L1 downlink signaling(s) is(are) downlink signaling(s) out of L downlink signalings of which each downlink signaling indicates the updated target information set out of the M information sets, a measurement used for generating the first updating signaling is limited within the L1 multicarrier symbol group(s).

7. The method in a base station for wireless communications, comprising:
transmitting a first signaling, the first signaling being used for determining M information sets, any information set of the M information sets comprising a positive integer number of information element(s), any information element of the positive integer number of information element(s) comprising a first-type index and a second-type index set, the second-type index set comprising one second-type index or more second-type indices, and the M being a positive integer greater than 1;
transmitting a second signaling, the second signaling being used for determining a first information set out of the M information sets;

transmitting a third signaling, the third signaling being associated with the second signaling, and the third signaling being used for determining a first information element out of the first information set; and
transmitting a first radio signal in a first frequency sub-band, (a) measurement(s) on (an) antenna port group(s) identified by (a) second-type index(indices) comprised in the first information element being used for a reception of the first radio signal; or, transmitting a first radio signal in a first frequency sub-band, (an) antenna port group(s) identified by (a) second-type index(indices) comprised in the first information element being used for a transmission of the first radio signal;
wherein the third signaling comprises scheduling information of the first radio signal, and an antenna port group comprises a positive integer number of antenna port(s).

8. The method according to claim 7, wherein a number of bits in the first signaling used for indicating any one given first-type index in the M information sets is smaller than a number of bits in the first signaling used for indicating a second-type index in a second-type index set corresponding to the given first-type index;
or, the third signaling comprises a first field, the first field of the third signaling is used for determining the first information element out of the first information set, a number of bits comprised by the first field of the third signaling is related to the first information set;
or, comprising:
transmitting L downlink signalings, the L downlink signalings respectively indicating that L multicarrier symbol groups are occupied, each multicarrier symbol group of the L multicarrier symbol groups comprising a positive integer number of multicarrier symbol(s), the L being a positive integer greater than 1; and
receiving a first updating signaling, the first updating signaling being used for updating a target information set, the updated target information set being an information set of the M information sets;
wherein L1 multicarrier symbol group(s) respectively corresponds(correspond) to L1 downlink signaling(s), the L1 downlink signaling(s) is(are) downlink signaling(s) of the L downlink signalings of which each downlink signaling indicates the updated target information set out of the M information sets, a measurement used for generating the first updating signaling is limited within the L1 multicarrier symbol group(s).

9. The method according to claim 7, wherein the second signaling indicates that a first multicarrier symbol group is occupied, the first multicarrier symbol group comprises a positive integer number of multicarrier symbol(s), time domain resources occupied by the third signaling are within the first multicarrier symbol group;
or, all multicarrier symbols between time domain resources occupied by the second signaling and time domain resources occupied by the third signaling are occupied;
or, all multicarrier symbols between time domain resources occupied by the second signaling and time domain resources occupied by the first radio signal are occupied, the base station transmits the first radio signal in the first frequency sub-band;
or, the third signaling and the second signaling occupy a same time slice in time domain, the time slice comprises a positive integer number of contiguous multicarrier symbols;

or, the third signaling and the second signaling belong to a same search space.

10. The method according to claim 7, comprising:
determining a type of a first access detection,
wherein the base station receives the first radio signal in the first frequency sub-band, a transmitter of the first radio signal performs the first access detection on the first frequency sub-band before transmitting the first radio signal, the type of the first access detection is a candidate type of N candidate types, the type of the first access detection and the second signaling are jointly used for determining the first information set out of the M information sets;
or, comprising:
performing a second access detection on the first frequency sub-band,
wherein the second access detection includes:
performing P energy detections respectively in P time sub-pools on the first frequency sub-band to obtain P detection values respectively,
wherein each of P1 detection value(s) out of the P detection values is lower than a second threshold, the P is a positive integer, the P1 is a positive integer no greater than the P.

11. A UE for wireless communications, comprising:
a first receiver, receiving a first signaling, a second signaling and a third signaling; the first signaling is used for determining M information sets, any information set of the M information sets comprises a positive integer number of information element(s), any information element of the positive integer number of information element(s) comprises a first-type index and a second-type index set, the second-type index set comprises one second-type index or more second-type indices; the second signaling is used for determining a first information set out of the M information sets; the third signaling is associated with the second signaling, the third signaling is used for determining a first information element out of the first information set;
a first processor, receiving a first radio signal in a first frequency sub-band, (a) measurement(s) on (an) antenna port group(s) identified by (a) second-type index(indices) comprised in the first information element being used for a reception of the first radio signal; or, transmitting a first radio signal in a first frequency sub-band, (an) antenna port group(s) identified by (a) second-type index(indices) comprised in the first information element being used for a transmission of the first radio signal;
wherein the third signaling comprises scheduling information of the first radio signal, the M is a positive integer greater than 1, and an antenna port group comprises a positive integer number of antenna port(s).

12. The UE according to claim 11, wherein a number of bits in the first signaling used for indicating any one given first-type index in the M information sets is smaller than a number of bits in the first signaling used for indicating a second-type index in a second-type index set corresponding to the given first-type index;
or, the third signaling comprises a first field, the first field of the third signaling is used for determining the first information element out of the first information set, a number of bits comprised by the first field of the third signaling is related to the first information set.

13. The UE according to claim 11, wherein the second signaling indicates that a first multicarrier symbol group is occupied, the first multicarrier symbol group comprises a positive integer number of multicarrier symbol(s), time domain resources occupied by the third signaling are within the first multicarrier symbol group;
or, all multicarrier symbols between time domain resources occupied by the second signaling and time domain resources occupied by the third signaling are occupied;
or, all multicarrier symbols between time domain resources occupied by the second signaling and time domain resources occupied by the first radio signal are occupied, the UE receives the first radio signal in the first frequency sub-band;
or, the third signaling and the second signaling occupy a same time slice in time domain, the time slice comprises a positive integer number of contiguous multicarrier symbols;
or, the third signaling and the second signaling belong to a same search space.

14. The UE according to claim 11, wherein the first receiver performs a first access detection on the first frequency sub-band; herein, the UE transmits the first radio signal in the first frequency sub-band; a type of the first access detection is a candidate type of N candidate types; the type of the first access detection and the second signaling are jointly used for determining the first information set out of the M information sets; the first access detection includes:
performing Q energy detections respectively in Q time sub-pools on the first frequency sub-band to obtain Q detection values respectively;
wherein each of Q1 detection value(s) out of the Q detection values is lower than a first threshold; a value of the Q1 is dependent on the type of the first access detection; the Q is a positive integer, the Q1 is a positive integer no greater than the Q.

15. The UE according to claim 14, wherein the type of the first access detection is a first-type uplink access detection, the Q1 is a candidate integer of K1 candidate integers; the K1 is a positive integer;
or, the type of the first access detection is a second-type uplink access detection, the Q1 is equal to 2.

16. The UE according to claim 11, wherein the first receiver receives L downlink signalings, the L downlink signalings respectively indicate that L multicarrier symbol groups are occupied, each multicarrier symbol group of the L multicarrier symbol groups comprises a positive integer number of multicarrier symbol(s), the L is a positive integer greater than 1; the first processor transmits a first updating signaling, the first updating signaling is used for updating a target information set, the updated target information set is an information set of the M information sets; wherein L1 multicarrier symbol group(s) respectively corresponds(correspond) to L1 downlink signaling(s), the L1 downlink signaling(s) is(are) downlink signaling(s) of L downlink signalings of which each downlink signaling indicates the updated target information set out of the M information sets, a measurement used for generating the first updating signaling is limited within the L1 multicarrier symbol group(s).

17. A base station for wireless communications, comprising:
a first transmitter, transmitting a first signaling, a second signaling and a third signaling; the first signaling is used for determining M information sets, any information set of the M information sets comprises a positive integer number of information element(s), any information element of the positive integer number of information element(s) comprises a first-type index and a second-type index set, the second-type index set comprises one second-type index or more second-type indices; the second signaling is used for determining a first information set out of the M information sets; the third signaling is associated with the second signaling, the third signaling is used for determining a first information element out of the first information set;

a second processor, transmitting a first radio signal in a first frequency sub-band, (a) measurement(s) on (an) antenna port group(s) identified by (a) second-type index(indices) comprised in the first information element being used for a reception of the first radio signal; or, receiving a first radio signal in a first frequency sub-band, (an) antenna port group(s) identified by (a) second-type index(indices) comprised in the first information element being used for a transmission of the first radio signal;

wherein the third signaling comprises scheduling information of the first radio signal, the M is a positive integer greater than 1, and an antenna port group comprises a positive integer number of antenna port(s).

18. The base station according to claim 17, wherein a number of bits in the first signaling used for indicating any one given first-type index in the M information sets is smaller than a number of bits in the first signaling used for indicating a second-type index in a second-type index set corresponding to the given first-type index;
   or, the third signaling comprises a first field, the first field of the third signaling is used for determining the first information element out of the first information set, a number of bits comprised by the first field of the third signaling is related to the first information set;
   or, the first transmitter transmits L downlink signalings, the L downlink signalings respectively indicate that L multicarrier symbol groups are occupied, each multicarrier symbol group of the L multicarrier symbol groups comprises a positive integer number of multicarrier symbol(s), the L is a positive integer greater than 1; the second processor receives a first updating signaling, the first updating signaling is used for updating a target information set, the updated target information set is an information set of the M information sets; wherein L1 multicarrier symbol group(s) respectively corresponds(correspond) to L1 downlink signaling(s), the L1 downlink signaling(s) is(are) downlink signaling(s) of the L downlink signalings of which each downlink signaling indicates the updated target information set out of the M information sets, a measurement used for generating the first updating signaling is limited within the L1 multicarrier symbol group(s).

19. The base station according to claim 17, wherein the second signaling indicates that a first multicarrier symbol group is occupied, the first multicarrier symbol group comprises a positive integer number of multicarrier symbol(s), time domain resources occupied by the third signaling are within the first multicarrier symbol group;
   or, all multicarrier symbols between time domain resources occupied by the second signaling and time domain resources occupied by the third signaling are occupied;
   or, all multicarrier symbols between time domain resources occupied by the second signaling and time domain resources occupied by the first radio signal are occupied, the base station transmits the first radio signal in the first frequency sub-band;
   or, the third signaling and the second signaling occupy a same time slice in time domain, the time slice comprises a positive integer number of contiguous multicarrier symbols;
   or, the third signaling and the second signaling belong to a same search space.

20. The base station according to claim 17, wherein the first transmitter determines a type of a first access detection, wherein the base station receives the first radio signal in the first frequency sub-band, a transmitter of the first radio signal performs the first access detection on the first frequency sub-band before transmitting the first radio signal, the type of the first access detection is a candidate type of N candidate types, the type of the first access detection and the second signaling are jointly used for determining the first information set out of the M information sets;
   or, the second processor performs a second access detection on the first frequency sub-band, wherein the second access detection includes:
   performing P energy detections respectively in P time sub-pools on the first frequency sub-band to obtain P detection values respectively,
   wherein each of P1 detection value(s) out of the P detection values is lower than a second threshold, the P is a positive integer, the P1 is a positive integer no greater than the P.

* * * * *